US012627735B2

(12) United States Patent
Sindel et al.

(10) Patent No.: US 12,627,735 B2
(45) Date of Patent: May 12, 2026

(54) MODULAR DATA AND POWER NETWORK BEING UNIVERSALLY MOUNTABLE

(71) Applicants: Nathan Sindel, Simi Valley, CA (US);
Jaime Emmanuelli, Simi Valley, CA (US)

(72) Inventors: Nathan Sindel, Simi Valley, CA (US);
Jaime Emmanuelli, Simi Valley, CA (US)

( * ) Notice: Subject to any disclaimer, the term of this patent is extended or adjusted under 35 U.S.C. 154(b) by 506 days.

(21) Appl. No.: 18/370,210

(22) Filed: Sep. 19, 2023

(65) Prior Publication Data

US 2024/0015222 A1     Jan. 11, 2024

Related U.S. Application Data

(62) Division of application No. 17/060,046, filed on Sep. 30, 2020, now Pat. No. 11,824,935.

(Continued)

(51) Int. Cl.
| | |
|---|---|
| *H04L 67/12* | (2022.01) |
| *F24F 13/00* | (2006.01) |
| *G06F 1/18* | (2006.01) |
| *G06F 1/183* | (2026.01) |
| *G06F 1/188* | (2026.01) |

(Continued)

(52) U.S. Cl.
CPC .............. *H04L 67/12* (2013.01); *F24F 13/00* (2013.01); *G06F 1/18* (2013.01); *G06F 1/183* (2013.01); *G06F 1/188* (2013.01); *G06F 11/3031* (2013.01); *G06F 13/409* (2013.01); *G16Y 30/00* (2020.01); *H04Q 1/09* (2013.01); *H04W 52/46* (2013.01)

(58) Field of Classification Search
CPC .. H04L 67/12; F24F 13/00; G06F 1/18; G06F 1/183; G06F 1/188; G06F 11/3031; G06F 13/409; G16Y 30/00; H04Q 1/09; H04Q 1/025; H04W 52/46; Y04S 40/18
See application file for complete search history.

(56) References Cited

U.S. PATENT DOCUMENTS

| | | | | |
|---|---|---|---|---|
| 2005/0270151 A1* | 12/2005 | Winick | .................. | G08B 17/00 |
| | | | | 340/539.1 |
| 2007/0027948 A1* | 2/2007 | Engebretsen | ........... | G06F 1/181 |
| | | | | 709/203 |

(Continued)

*Primary Examiner* — Ankur Jain
(74) *Attorney, Agent, or Firm* — Judd M. Patton

(57) ABSTRACT

Described may be a modular network communication system for use in a foundational structure, for the inclusion of new foundational structure construction, or configured for mobility between different foundational structures. The network communication system may be configured to support a broad array of network-related communications. The foundational structure's modular network communication system may have a controller, a power connection point, a communication protocol, and may include one or more than one network node. The controller unit may have processing circuitry and may be configured to utilize a communication protocol for controlling the foundational structure's information flow of the modular network communication system. Additionally, the controller may be further configured to communicate with at least one, but also more than one network-connected device which may or may not be connected to the internet.

18 Claims, 14 Drawing Sheets

Related U.S. Application Data

(60) Provisional application No. 62/911,884, filed on Oct. 7, 2019.

(51) Int. Cl.

| | |
| --- | --- |
| *G06F 11/30* | (2006.01) |
| *G06F 13/40* | (2006.01) |
| *G16Y 30/00* | (2020.01) |
| *H04Q 1/02* | (2006.01) |
| *H04W 52/46* | (2009.01) |

(56) References Cited

U.S. PATENT DOCUMENTS

| | | | |
| --- | --- | --- | --- |
| 2016/0234960 A1* | 8/2016 | Masuyama | H05K 7/1498 |
| 2018/0202674 A1* | 7/2018 | Lin | G05B 19/042 |

* cited by examiner

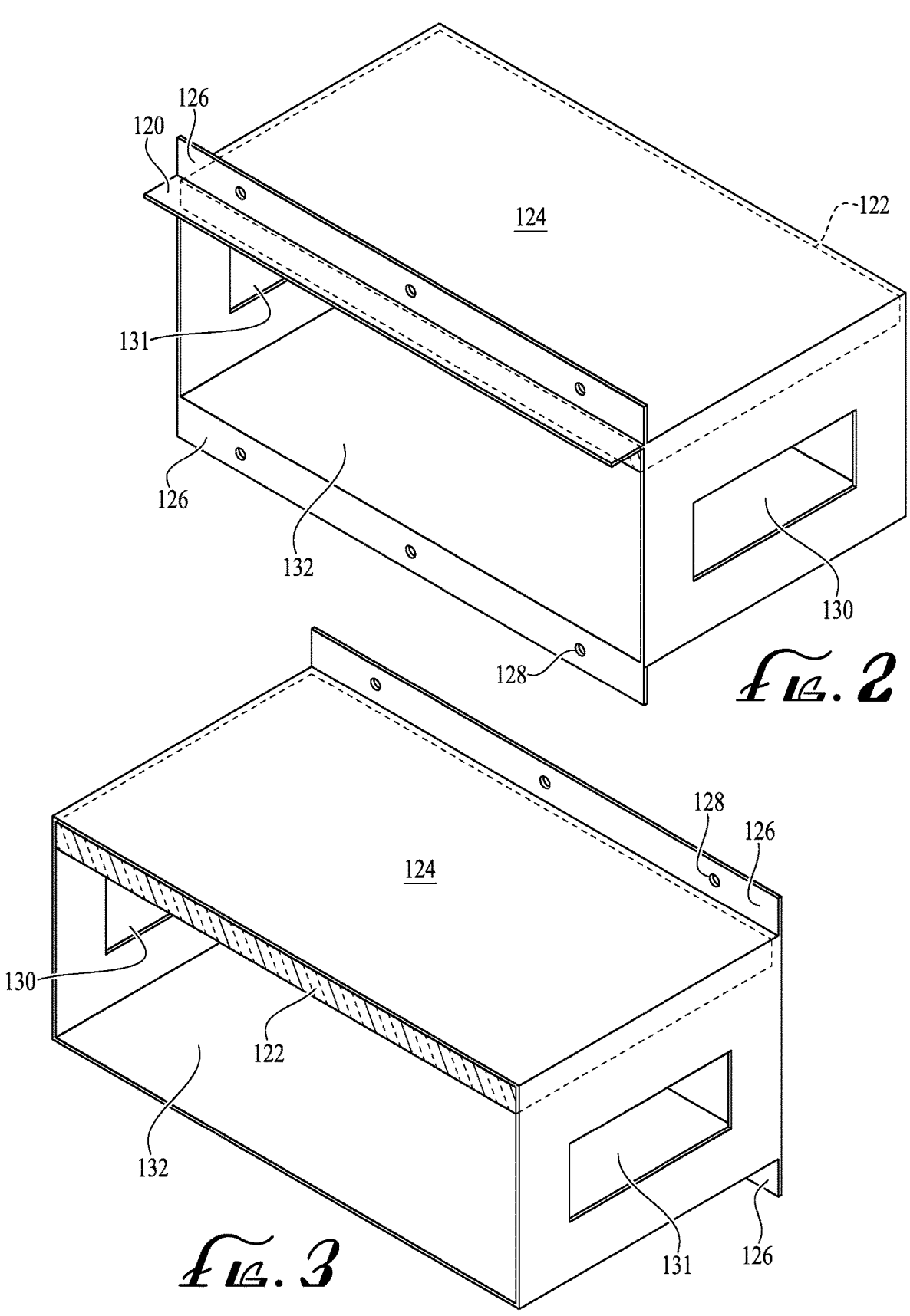

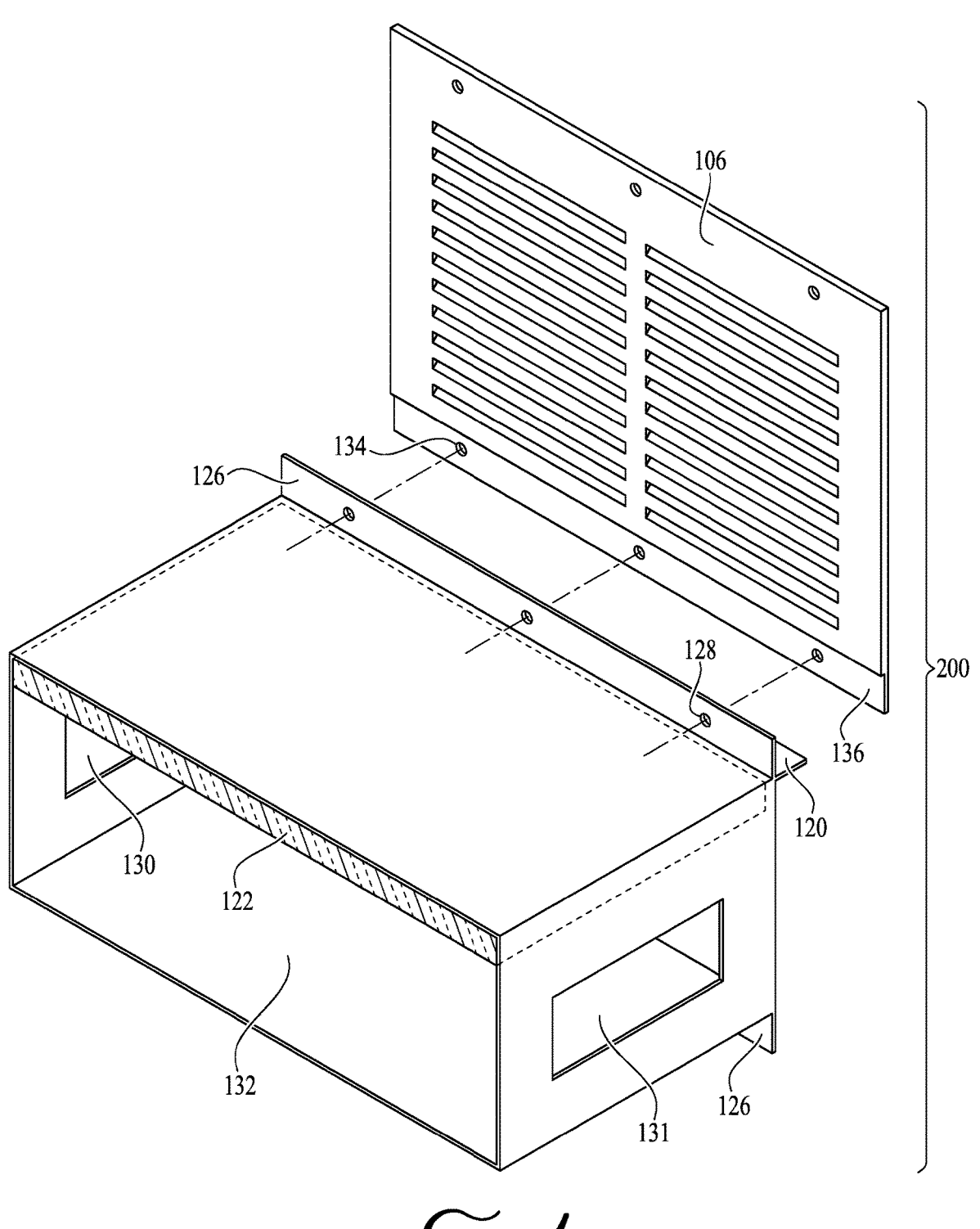
$\mathcal{F}$IG. 4

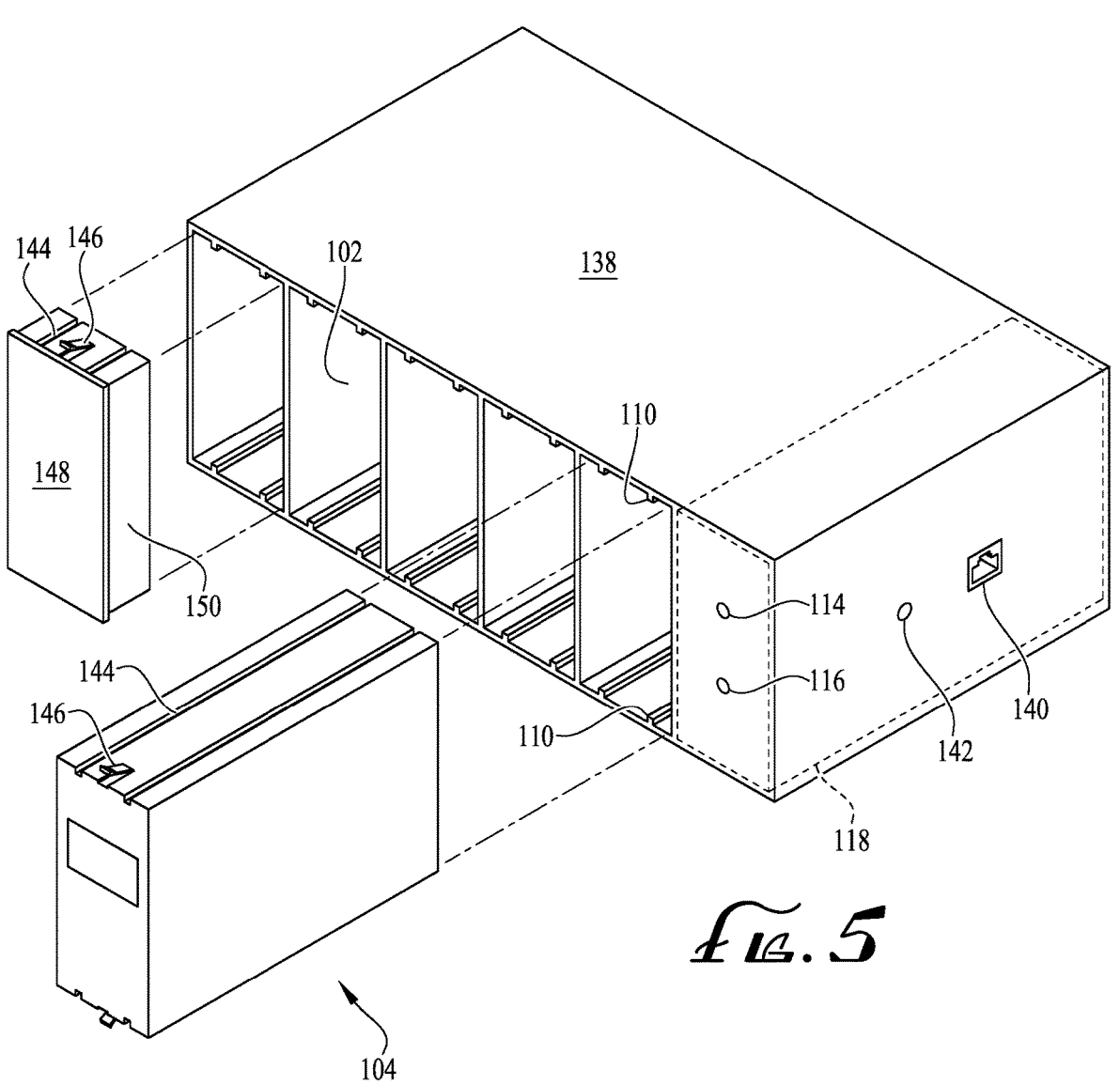
144  146
148
150
102
138
110
114
116
110
118
142
140
144
146
104
_Fig.5_

MODULAR DATA AND POWER NETWORK BEING UNIVERSALLY MOUNTABLE

RELATED APPLICATIONS

This application is a divisional of U.S. patent application Ser. No. 17/060,046 filed on Sep. 30, 2020, which claims the benefit of U.S. Provisional Application No. 62/911,884 filed Oct. 7, 2019. All the above-identified applications are hereby incorporated by reference in their entireties as though fully and completely set forth herein.

TECHNICAL FIELD

The disclosure herein relates generally to modular nodes and housing therein which is universally mountable. More particularly, the disclosure relates to devices and apparatuses to facilitate the deployment of a modular data and power network system, being integratable with any smart network, which may perform a wide variety of smart structure functions and to better enable any given constructed and foundational structure equipped with said smart functions the full ability to provide any internet and/or network-connected device a singular avenue of connectivity.

BACKGROUND

Use of household, industrial, or commercial technologies such as security systems, HVAC (Heating, Ventilation, Air Conditioning) control, Wi-Fi, and other technologies that send, receive, aggregate and process data presently requires each of these technologies to be installed separately, often utilizing incompatible network architecture or otherwise requires additional complexity and/or devices to send, receive, aggregate and process. In particular, with the advent of the 'smart home' or 'smart workspace' concept, these otherwise independent technologies are increasingly being required to interconnect, for which presently there is no uniformity in design, data architecture, or function, and which leads to multiple networks for each type of device and/or data that is being collected within a single network for a given structure. All smart home or work functionality, whether independent or interconnected, requires data input, aggregation, processing, and output, increasingly from multiple devices and technologies to provide the result(s) desired by the user.

Further, the space available for each of these devices and/or functions that are being utilized, grows increasingly scarce in a given environment, and connecting each of these devices, if independent, results in significant data, power, and other connections from the device to a centralized location, or locations. This further negatively impacts the functionality of each device, if independent, in that the optimum location for the functionality of such a device may be limited and/or compromised based on the location available. Such space requirements, as new technologies and devices are made available, often result in complexity, confusion, selection of the less-than-optimal location of such device(s), and further requires multiple secondary locations to aggregate the data generated by such devices, which then requires processing to render any of the data generated usable for a given smart home or office function.

What is needed is a platform in which technologies do not need to be installed in separate locales, thus freeing up network architecture and usable space in a given environment. Moreover, said platform should be made simple, widely compatible with other devices, and otherwise does not require additional complexity from devices to send, receive, aggregate, and process data. Such a platform should seamlessly integrate with current and future smart home and smart workspace concepts and provide interconnectivity and uniformity in design and function. Further, said platform should occupy as little space as possible for each of these devices and/or functions utilized and not impact the already increasingly scarce physical space available to technology, devices, and the technology arising from the many devices. Finally, what space is utilized for the platform should be an optimal location such that the technology provided by the platform will provide the greatest efficacy for the smallest space cost.

SUMMARY

Herein described may be a modular network communication system for either the installation into a built foundational structure, for the including of new foundational structure construction, or configured for mobility between different foundational structures. The network communication system may be configured to support a broad array of network-related communications of the foundational structure. The foundational structure's modular network communication system may have a controller, a power connection point, a communication protocol, an optional user interface supporting a user experience, may employ a machine learning algorithm, and may include one or more than one network node. The controller unit may have processing circuitry and may be configured to utilize a communication protocol for controlling the foundational structure's information flow of the modular network communication system. Additionally, the controller may be further configured to communicate with at least one, but also more than one network node and at least one, but also more than one network-connected device which may or may not be connected to the internet. The user interface supporting a user experience may be separately installed by downstream manufactures when the said manufacturers are installing the supported downstream functionality or may be installed into the controller processing circuitry.

The network nodes may be configured to communicate with the controller as well and may have additional processing circuitry. The node processing circuitry may be configured to additionally utilize the communication protocol to send and receive data from the controller unit and may be configured to support the modular network communication system from any location of the foundational structure. The network nodes may also be configured to communicate with a network-connected device. The node may have a node housing or a module housing. The node housing may also have a node power connection point and a data communication connection. The node power connection point and the data connection point may share the same physical architecture due to the nature of modern electronics or may share separate architecture depending on the needs of an end consumer or manufacturer. Further, the node housing may be configured for installation at any location of the foundational structure. The controller may be housed by a controller unit housing. The controller unit housing may further have the power connection point configured to connect to a power source, the data communication connection for the sending and receiving of information. The controller unit housing may be configured for installation at any localized point of the foundational structure.

Further described may be a modular network communication system that may utilize a module bay assemblage which may have one or more than one module bay, a controller, a power connection point, and a data connection point. The module bay may be configured to reversibly receive a module. The bay may have guides which may aid in the proper alignment of the modules during removal or replacement of the module.

BRIEF DESCRIPTION OF THE DRAWINGS

The foregoing and other features of the present disclosure will become more fully apparent from the following description, taken in conjunction with the accompanying drawings. Understanding that these drawings depict only several embodiments in accordance with the disclosure and are not to be considered limiting of its scope, the disclosure will be described with additional specificity and detail through the use of accompanying drawings. Accordingly, further advantages of the present disclosure may become apparent to those skilled in the art with the benefit of the following detailed description of the preferred embodiments and upon reference to the accompanying drawings in which:

FIG. 2 is a perspective view of one non-limiting embodiment of a mountable hub configured such that installation may be permanent and internal to a wall;

FIG. 3 is a perspective view of one non-limiting embodiment of a mountable hub configured such that installation may be temporary and external to a wall;

FIG. 4 is a perspective view of one non-limiting embodiment of a mountable hub configured such that installation may be temporary, as a kit, and external to a wall;

FIG. 5 is a perspective view of one non-limiting embodiment illustrating a module bay insert configurable to integrate with various other modules;

DESCRIPTION OF THE VARIOUS DISCLOSED EMBODIMENTS

Figure 1:
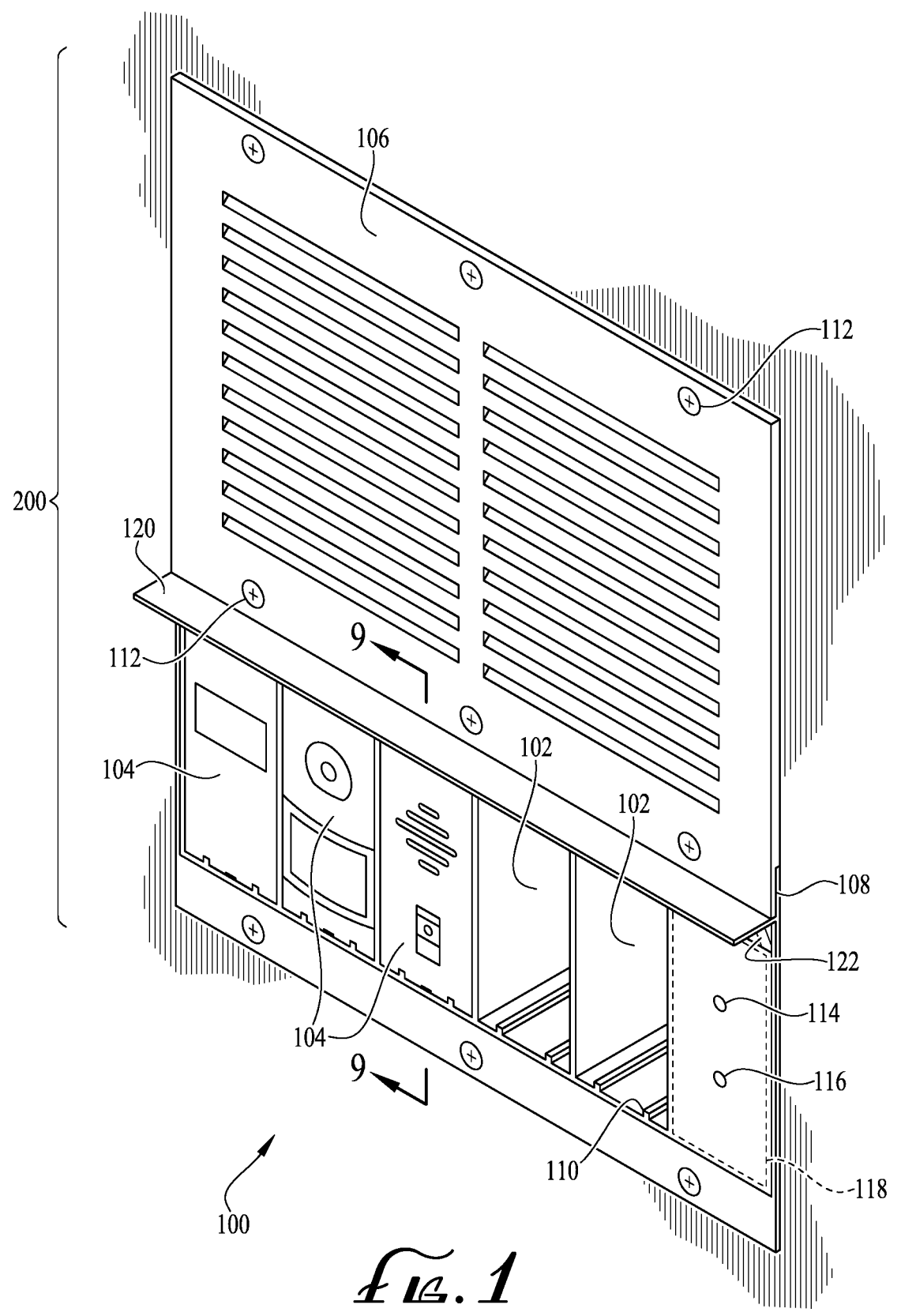
FIG. 1 is a perspective view of one non-limiting embodiment of a modular network communication system for use in the application and support of smart home features and functions.

Embodiments of systems, components, and methods of assembly and manufacture will now be described with reference to the accompanying figures. Although several embodiments, examples, and illustrations are disclosed below, it will be understood by those of ordinary skill in the art that the embodiments described herein extend beyond the specifically disclosed configurations, examples, and illustrations, and can include other users of the disclosure and obvious modifications and equivalents thereof. The terminology used in the descriptions presented herein is not intended to be interpreted in any limited or restrictive manner simply because it is being used in conjunction with a detailed description of certain specific embodiments of the disclosure. In addition, embodiments of the disclosure can comprise several novel features and no single feature is solely responsible for its desirable attributes or is essential to practicing any one of the several embodiments herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," "top," "bottom" and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specially mentioned above, derivatives thereof, and words of similar import.

Referring to the drawings, like reference numerals designate identical or corresponding features throughout the several views. Described herein are certain non-limiting embodiments of a modular network communication system 100 for use in the application and support of smart home features and functions therein.

Figure 6:
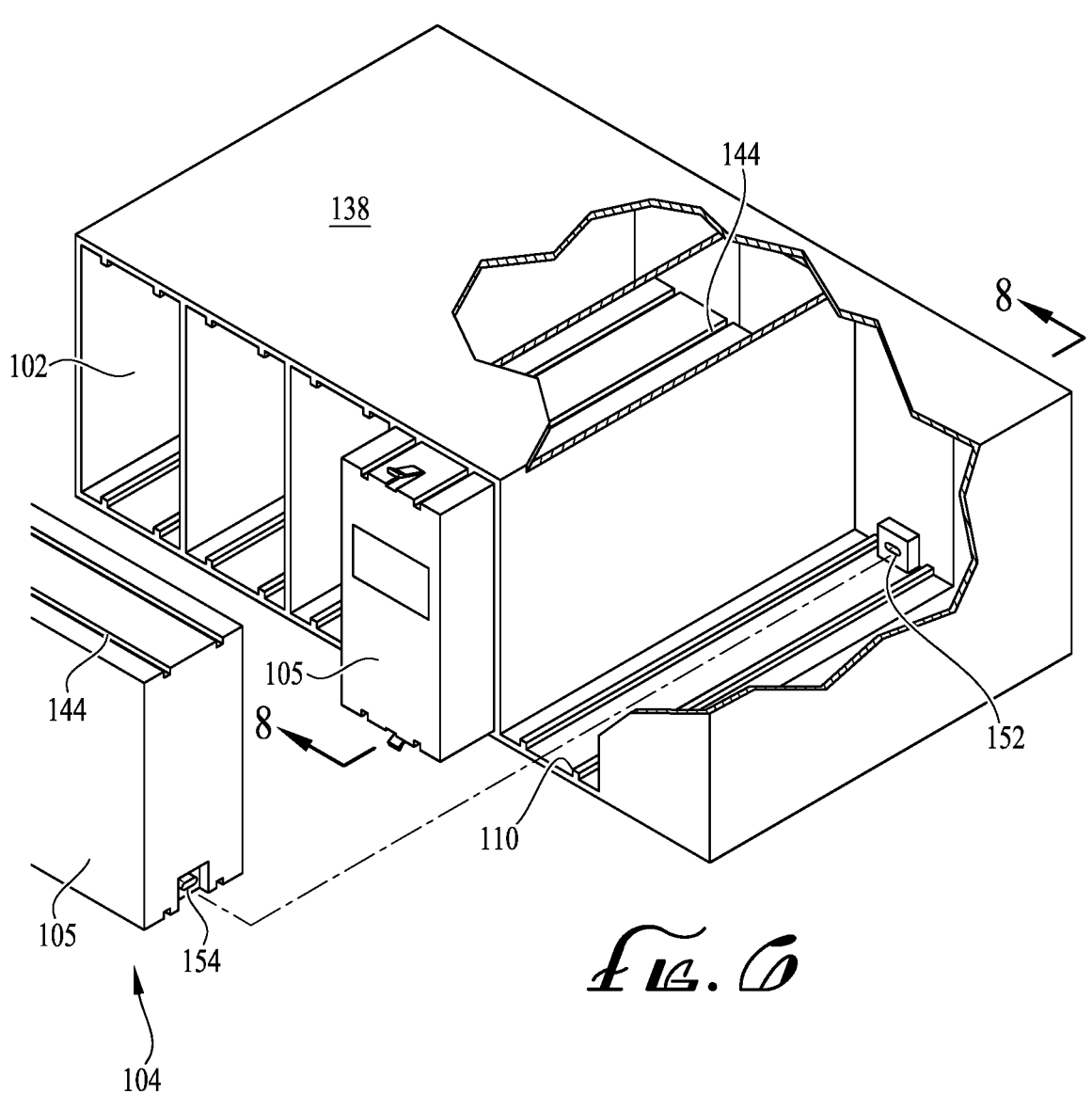
FIG. 6 is a perspective broken sectional view of one non-limiting embodiment illustrating a module bay insert configurable to integrate with various other modules.
Figure 11:
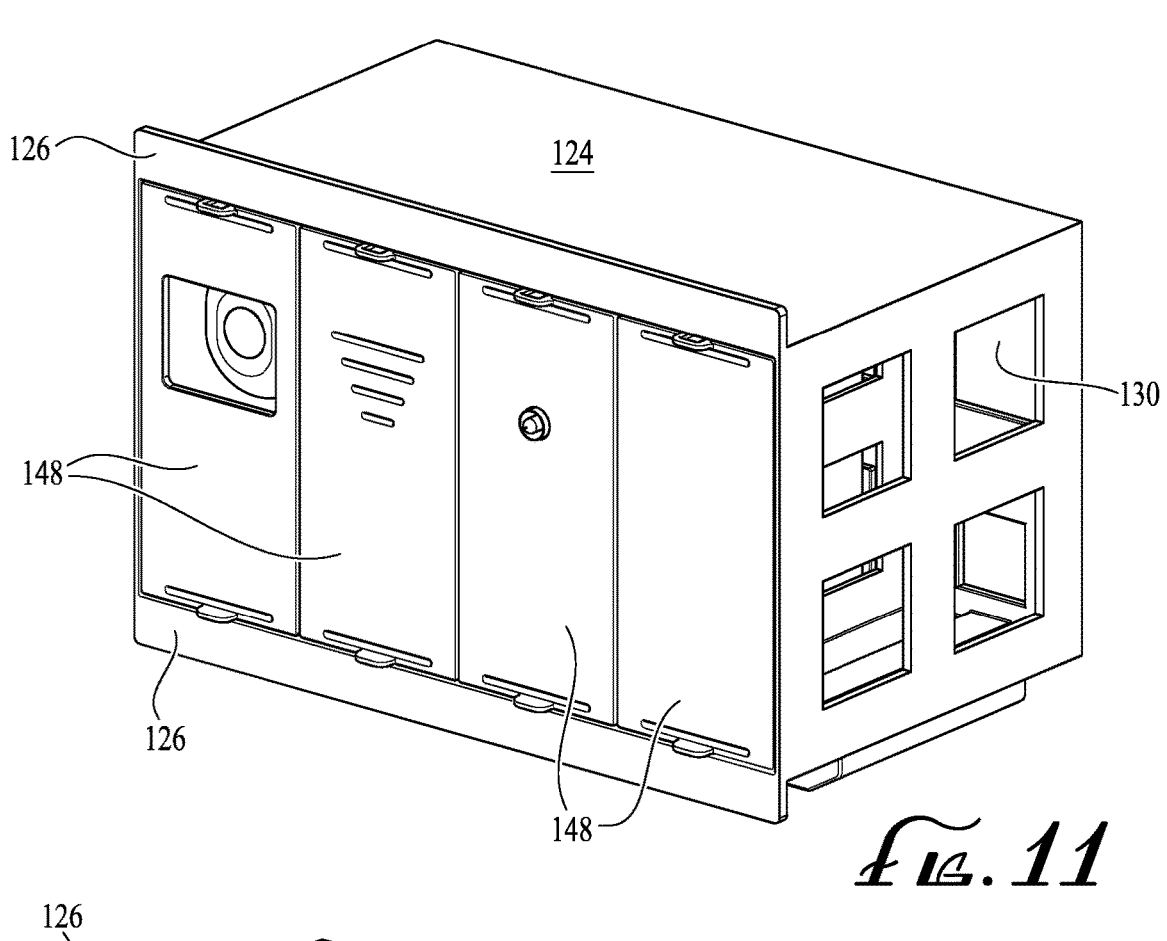
FIG. 11 is a perspective view of one non-limiting embodiment of a modular network communication system for use in the application and support of smart home features and functions.
Figure 12:
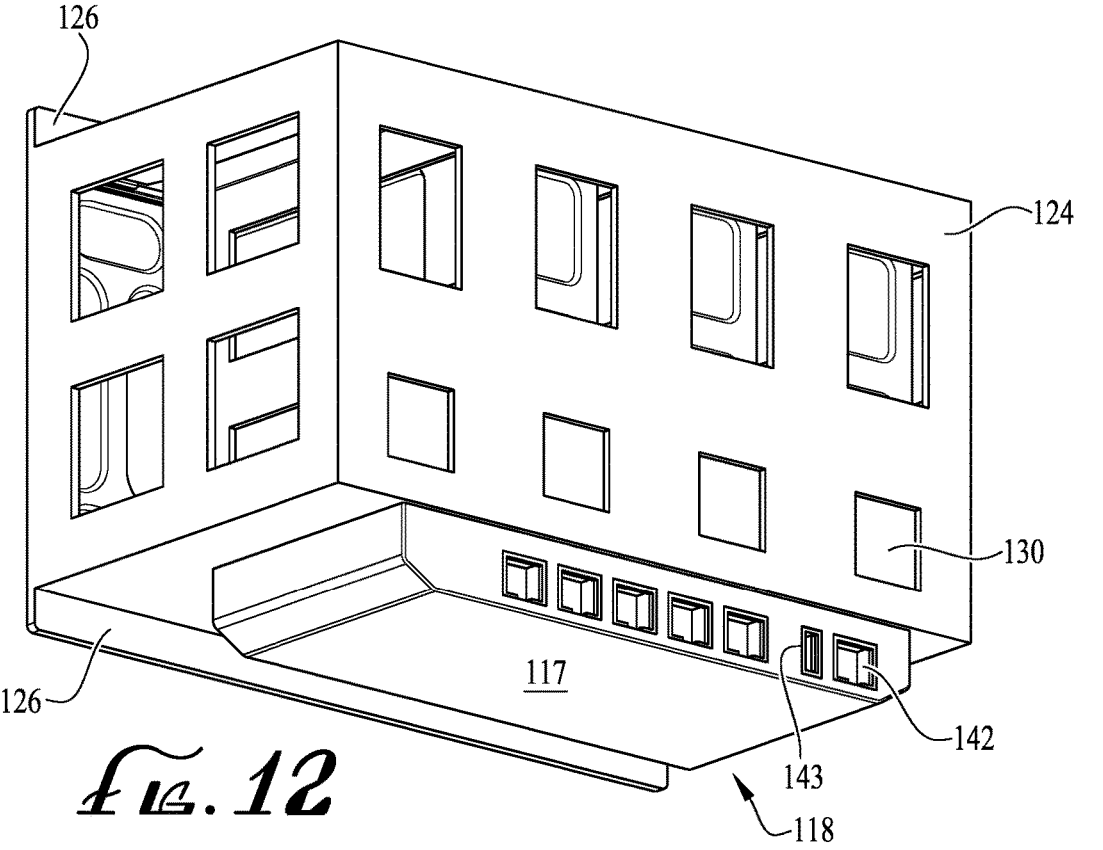
FIG. 12 is a backside perspective view of one non-limiting embodiment of a modular network communication system for use in the application and support of smart home features and functions.

FIGS. 1, 11, and 12 illustrate differing potential embodiments of a modular network communication system 100 as configured to accept various components to be selected by an end-user or installer prior to, or subsequent of, installation. Illustrated in FIG. 1 are bays 102 for a plurality of potential devices or components. Bays 102 may be contemplated to operate with a wide variety of modules 104. Modules 104 may be any number of potential sensors, data relay centers, various audio and video equipment, microphones, cameras, smoke detectors, motion detectors, temperature sensors, noise/sound monitors, any combination of the same, or any other technology which may arise in the future as the internet of things (IoT) progresses and unforeseen features become apparent. Moreover, the term modules 104 and nodes 104 may be interchangeable herein, and reference number 104 shall refer to both throughout. The modules 104 may be prefabricated and purchased off the shelf such that incorporation into bays 102 is as simple as plugging modules 104 into the bays 102 as indicated in FIGS. 1 and 6, or the module may be modified for compatibility with bays 102 to meet various and unpredictable end-user demands.

Figure 10:
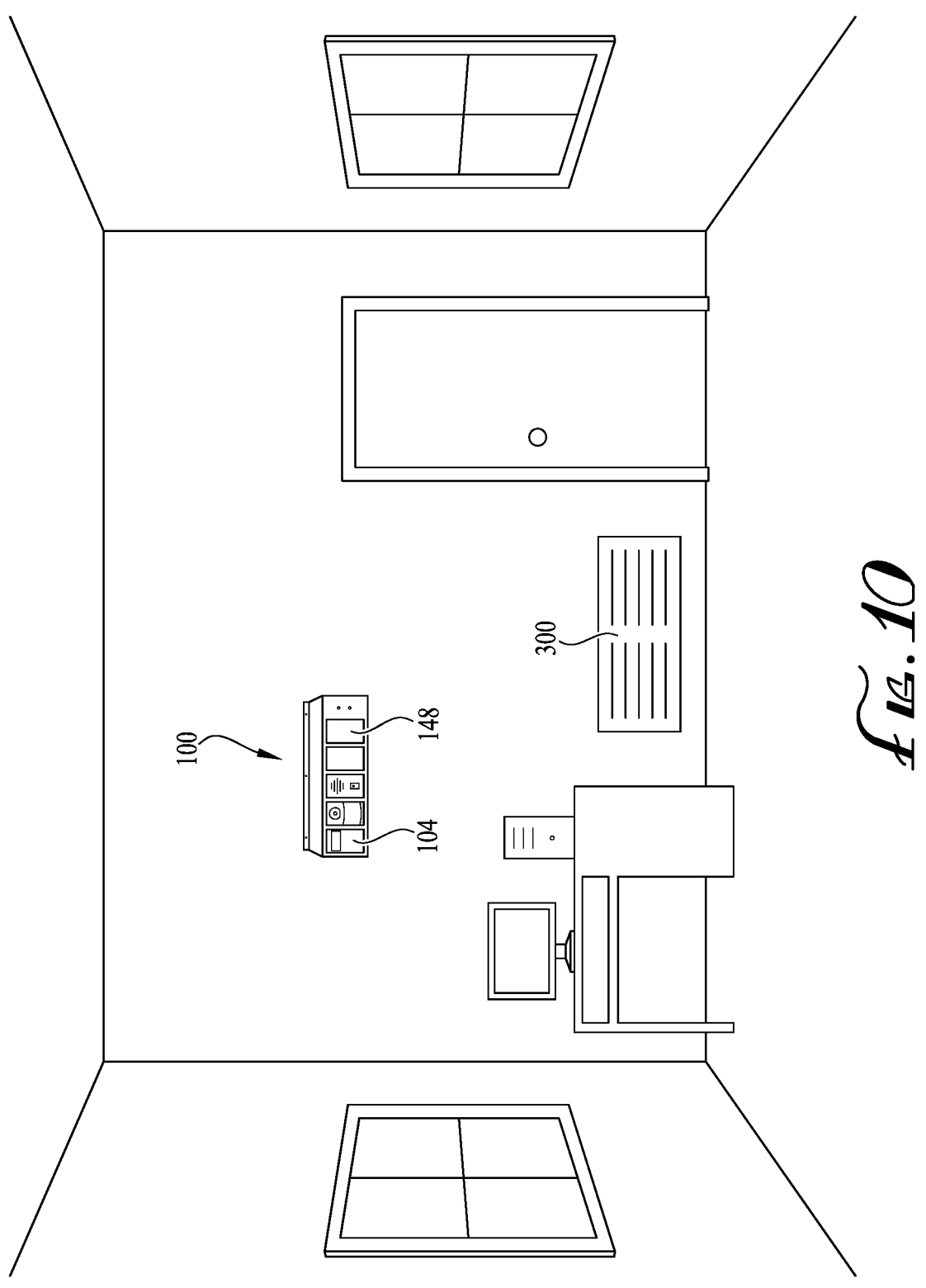
FIG. 10 is a perspective environmental view illustrating one non-limiting embodiment of a modular network communication system for use in the application and support of smart home features and functions.

FIG. 11 illustrates the modular network communication system 100 as it may appear with all the bays 102 filled, thus the bays 102 are not illustrated in FIG. 11. FIG. 12 may be a backside view of FIG. 11. FIG. 1 illustrates that a register 106 may be prefabricated such that the register 106 may overlap 108 the modular network communication system 100 and provide a finished appearance. Additionally, the overlap 108 may be in the reverse of the illustration of FIG. 1 as illustrated in FIG. 4, wherein the modular network communication system 100 may rest on top of the register 106 when finally installed and thus represents an additional embodiment. The register 106 may be constructed of a wide variety of metals such as aluminum, tin, or other lightweight metals, or of a number of plastics commonly used in the industry of register manufacturing. Such register 106 and modular network communication system 100 may be provided and/or sold as a kit 200 to an end consumer. In such a configuration as illustrated in FIG. 1, wherein the register 106 has the overlap 108, the register 106 and the modular network communication system 100 are contemplated as a ready to install kit 200. Alternatively, the modular network communication system 100 may mount under, or on top of, an industry-standard register 300 (as shown in FIG. 10) without consideration for a finished appearance, and not provided to market as a kit 200. In such an embodiment only the modular network communication system 100 would need to be sold, and the end-user may install the modular network communication system 100 at any location in a household, apartment space, or commercial space without consideration for the location of an existing HVAC register. The kit 200 may be provided to an end-user as illustrated in FIG. 1 or separately as individual parts.

Still referring to FIG. 1, shown are guides 110 located internal to the bays 102. Guides 110 may be to the top of the bays 102 and to the bottom of the bays 102. Guides 110 may aid in aligning the modules 104 appropriately for internal insertion to the bays such that further data and power connections may be completed, such connections are discussed in greater detail later in this disclosure. Additionally shown are register fasteners 112, a power indicator 114, and a data indicator 116. The power indicator 114 and data indicator 116 may be located to the face of a controller 118. The controller 118 may process data, may provide power to the other modules 104, and may generally regulate data and power to the various modules 104 located internal to the bays 102. Additionally, the controller 118 may be Wi-Fi capable and act as a Wi-Fi hub for internal living spaces. It is further contemplated that the controller 118 may utilize alternative methods of wireless communication either in combination Wi-Fi or alone. By way of example those additional wireless communication modes may include, Bluetooth, Near Field Communication, and any other current or future technologies not yet developed. The register fasteners 112 may be of any number of fasteners commonly used to secure to items together, by way of example, screws, bolts, clips, or any other variety of reversible fastener types. Further illustrated are an air shield 120 and insulation 122.

Air shield 120 and insulation 122 may work to prevent large swings in heating and cooling from occurring to the bays 102, to the modules 104, and to any sensors and/or detectors of the modules 104, when the modular network communication system 100 is installed in proximity to a register 106. Air shield 120 may be detachable from the modular network communication system 100 depending on any particular installation configuration.

Illustrated in FIG. 1 is one particular embodiment of the modular network communication system 100 and is shown installed under a Heating, Ventilation, and Air Conditioning (HVAC) register 106. As eluded to above, it is contemplated that the modular network communication system 100 may be installed without consideration for the location of the HVAC register 106 as is illustrated in FIG. 11. Such installation would free the modular network communication system 100 to be installed in an area best suited for the end-users' desired goals. Moreover, and based on the intended goal of the end consumer, the modular network communication system 100 is contemplated to be installed in all possible configurations, i.e., the modular network communication system 100 may be installed upside down from the illustration of FIG. 1 wherein the controller 118 is to the left side, the modular network communication system 100 may be installed above the register 106, and the modular network communication system 100 may be installed to any side of the register 106. FIG. 11 additionally illustrates an embodiment wherein the controller 118 may be mounted to the underside of a mountable hub 124. Also contemplated is that the modular network communication system 100 may be of a wide variety of contemplated shapes, with each individual bay 102, module 104, or other component being configured to match any particular overall shape of the modular network communication system 100. Such variation in geometric configurations may be based largely in the stylistic desires of the end consumer, by way of example, the modular network communication system 100 may be configured to generally look like a wall-mountable analog timekeeper. In such a configuration, the modular network communication system 100 would blend into the surrounding room and may be more aesthetically pleasing. Accordingly, a mounting flange 126 as illustrated in FIG. 11 would be shaped to match said configuration.

Figure 7:
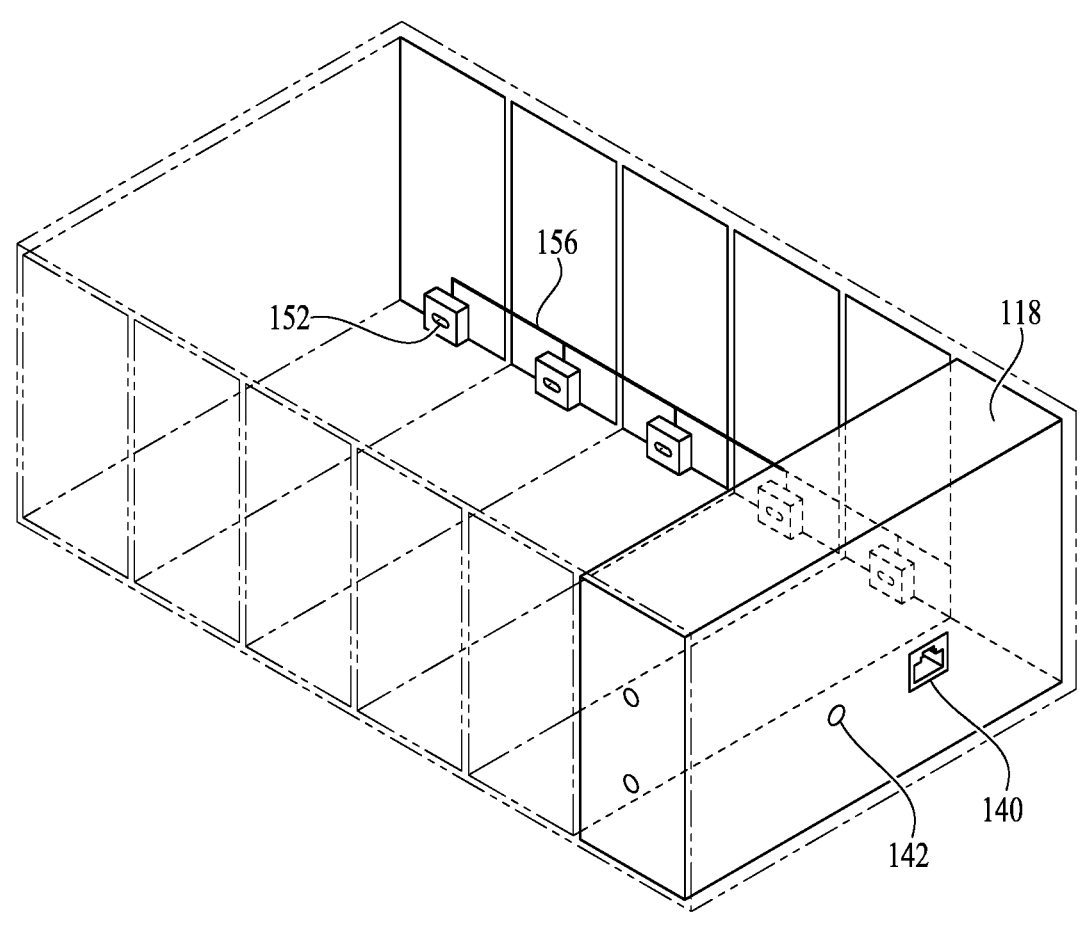
FIG. 7 is a perspective view of one non-limiting embodiment illustrating a module bay insert configurable to integrate with various modules wherein connection ports are illustrated; and, FIG. 8 is a sectional side view of one non-limiting embodiment illustrating a module insertion into a bay of a module bay insert.

As is repeatedly addressed in this disclosure, the modular network communication system 100 is modular and configured for a wide variety of potential installation modes. Accordingly, the modular network communication system 100 may have modular components as illustrated in FIG. 2 which may aid and speed the installation process. Shown, as in FIG. 11, is the mountable hub 124. The mountable hub may be contemplated for installation onto a wall, internal to a wall, in adjacent to an HVAC register 106 (as shown in FIG. 1), or not in proximity to a register 106 (as shown in FIG. 1). The particular embodiment illustrated in FIG. 2 is configured for installation into a wall, wherein removal of drywall or other wall material is required for installation and would be considered permanently installed. This is contrasted with FIG. 3 wherein the mountable hub may be configured for installation onto a wall, and no removal of wall material would be required and is thus considered temporary. End-users of the modular network communication system 100 (as shown in FIG. 1), wherein the installation is permanent, may be those who would be home or property owners. End-users of the modular network communication system 100 (as shown in FIG. 7), wherein installation is temporary, may be those who rent apartments or other property, including commercial property.

Referring to FIG. 2, in addition to previously indicated reference numbers, may further illustrate in addition to the mountable hub 124 with air shield 120 is a mounting flange 126, a mounting aperture 128, a first port 130, and a second port 131. The mounting flange 126 may be located to the top and bottom, or either side, of the mountable hub 124 such that installation may be omnidirectional. Further, the mounting apertures 128 may be in plurality. The first port 130 and second port 131 are illustrated as being on opposing ends of the mountable hub 124 such that the modules 104 (shown in FIG. 1) may be accessible from either end thus enabling omnidirectional installation options. Additional ports may be contemplated for further mounting configurations.

Referring to FIG. 3, in addition to previously indicated reference numbers, illustrated are all the same components as in FIG. 2 with the addition of showing a better view of the insulation 122. Insulation 122 may aid in preventing the internal components of the modular network communication system 100 from becoming too hot or too cold, thereby preventing foreseeable damage and/or spurious readings of any sensors located to any modules 104 from occurring when mounting occurs adjacent by a register 106 or industry-standard register 300 (shown in FIG. 10). FIG. 3, as indicated above, shows a configuration wherein installation of the mountable hub 124 may occur on a wall, and per this particular configuration, the air shield 120 is not shown and thus FIG. 3 may correspond to a configuration wherein the air shield 120 is detached.

Referring now to FIG. 4, in addition to previously indicated reference numbers, shown is an alternative installation pattern from FIG. 1. Illustrated in FIG. 4 is an embodiment which represents the discussed configuration of FIG. 3. Notably, the mountable hub 124 illustrated in FIG. 4 shows how the mounting flange 126 may align with the register 106 prior to fastening the register 106 and mountable hub 124 together. The mounting flange 126 may support the weight of the modular network communication system 100 as fully installed with various modules 104. Further, the air shield 120 is shown in FIG. 4 as being in an attached configuration. It is contemplated that not all installation configurations wherein the mountable hub 124 wall mounts external to the wall would require the prior removal of the air shield 120. The air shield 120 may comfortably fit in the air duct itself; however, as may be required by an end-users specific HVAC duct system, the air shield 120 may be configured to be detachable.

Still referring to FIG. 4, additionally shown is an insert chamber 132, a register fastener aperture 134, and an overlap recess 136. The insert chamber 132 may be designed to accept a module bay assemblage 138 (shown in FIG. 5). The register fastener aperture 134 in some preferred embodiments may align with mounting apertures 128 such that the register fasteners 112 (not shown) may pass through the mountable hub 124 and the register 106 for a reversibly fastened configuration. Where a kit 200 is contemplated, the mounting apertures 128 and the register fastener aperture 134 may align. However, the mounting apertures 128 and the register fastener aperture 134 do not need to align, and a hole may be drilled by an end-user where alignment does not occur by use of, for example only, a self-taping screw, a self-threading screw, nut and bolt, or other commonly used fastening mechanisms. The overlap recess 136 in FIG. 4 may be contrasted with that of FIG. 1 in that the overlap 108 (as shown in FIG. 1) may occur in the reverse of the illustration of FIG. 1. Accordingly, the kit 200 may include a register 106 which may be installed bi-directionally, and would, therefore, have no face or back as either planer side may function as a face or back of the register 106.

Figure 13:
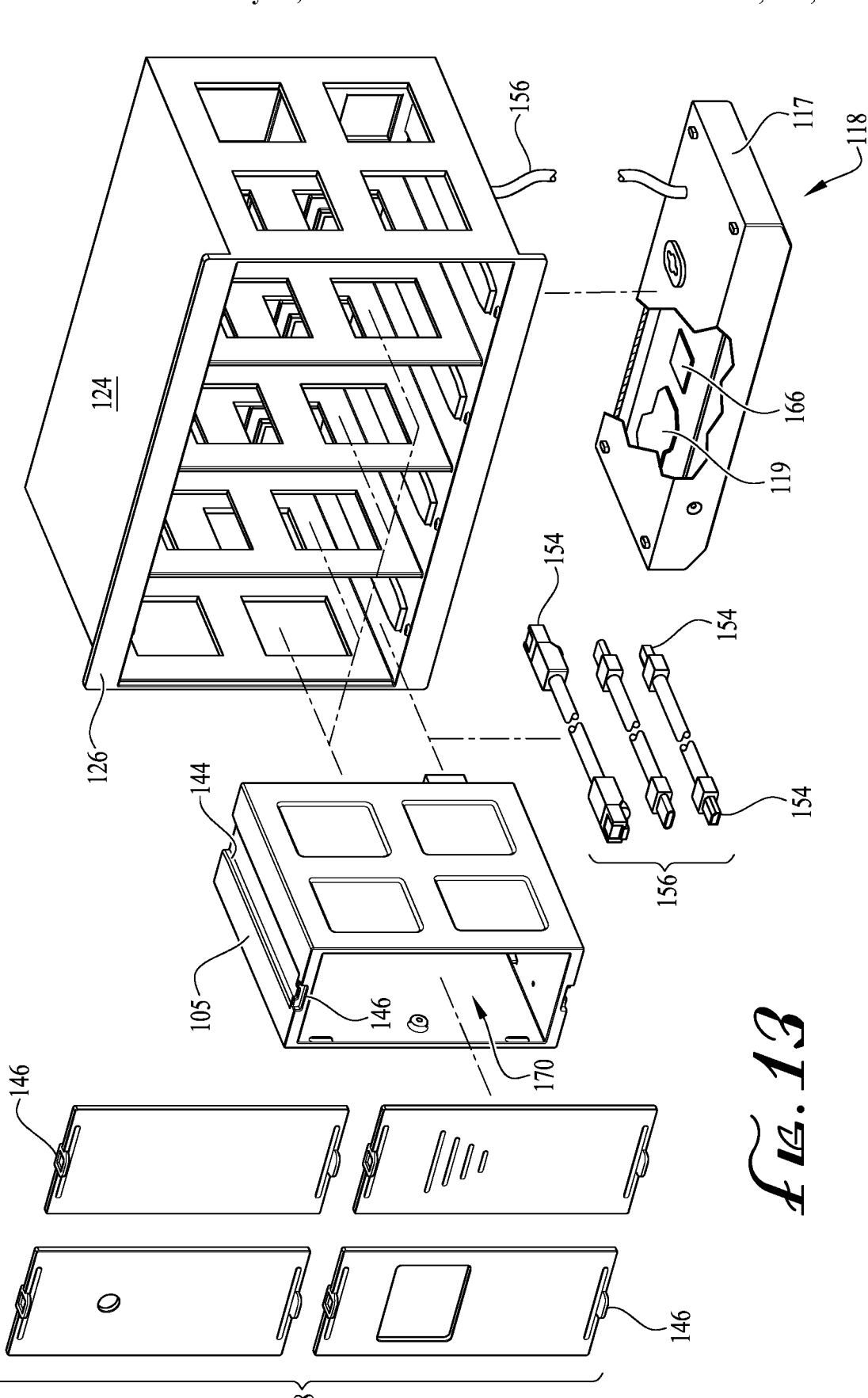
FIG. 13 is an exploded view of one non-limiting embodiment of a modular network communication system for use in the application and support of smart home features and functions.

Turning now to FIGS. 5 and 13, in addition to previously indicated reference numbers, shown are exploded views of different embodiments of the modular network communication system 100. FIG. 5 illustrates a module bay assemblage 138 for insertion into a mountable hub 124 (as shown in FIG. 1), while FIG. 13 illustrates the insertion of a modules 104 directly into the mountable hub 124 therein skipping the use of the module bay assemblage 138. As shown in FIG. 5, the module bay assemblage 138 may be retained in the mountable hub 124 by way of frictional forces; however, other methods of retention are contemplated, for example, screws, clips, or elastically biased members such as springs. Relevant portions of the module bay assemblage 138 include the previously noted insertable modules 104, the guides 110, the power indicator 114, and the data indicator 116. The power indicator 114 and the data indicator 116 are located to the face of the controller 118. Additional portions of the controller 118 include the Ethernet port 140 and the power connection point 142. It is further contemplated that the Ethernet port 140 may likewise provide power as a power over Ethernet configuration but is not required to do so as the power connection point 142 may further support additional power and data transmission needs. Ethernet port 140 and power connection point 142 are contemplated to be a wide variety of other types of ports, by way of non-limiting example only; Cat5 ethernet cable, RJ45 ethernet cable, phone RJ11 cable, eSATA cables, and/or data cables, and it should be understood that this disclosure does not unduly limit contemplated connectors or ports.

Further illustrated in FIGS. 5 and 13 are differing embodiments showing the installation of module 104 into the module bay assemblage 138, or as in the case of FIG. 13, directly into the mountable hub 124. Shown to the top of module 104 are a plurality of guide slots 144 which align with guides 110 to ensure that the modules 104 are properly aligned with the bays 102. Upon complete insertion of the modules 104 into the bays 102, a retention clip 146 may engage with the module bay assemblage 138, or the mountable hub 124, such that the modules 104 may be prevented from falling out or otherwise becoming disconnected with the modular network communication system 100 or the module bay assemblage 138 and the modular network communication system 100 (as shown in FIG. 1) as a whole. Further, in some other embodiments, the retention clip 146 may be of alternate retention means and may encompass a wide variety of fasteners, for example, screws, latches, different clips, or other elastically biased members such as springs. Additionally, it is contemplated that an end-user may not use every available bay 102 and may leave some empty, thus, in an effort to maintain cleanliness and integrity of an individual bay 102, a module cover 148 may be configured for detachable blocking of a bay 102 when not in use. The module cover 148 may also be used, instead of as a cover for an empty bay, as a cover of an active modules 104 and may indicate the functionality of any one given modules 104 as is illustrated in FIG. 13. The module cover 148 may have guide slots 144, retention clip 146, and an insertion wall 150 which may maintain the inserted module cover 148 in place by frictional forces in addition to the retention clip 146. The insertion wall 150 may not be required as the module cover 148 may flush mount in some embodiments.

Figure 16:
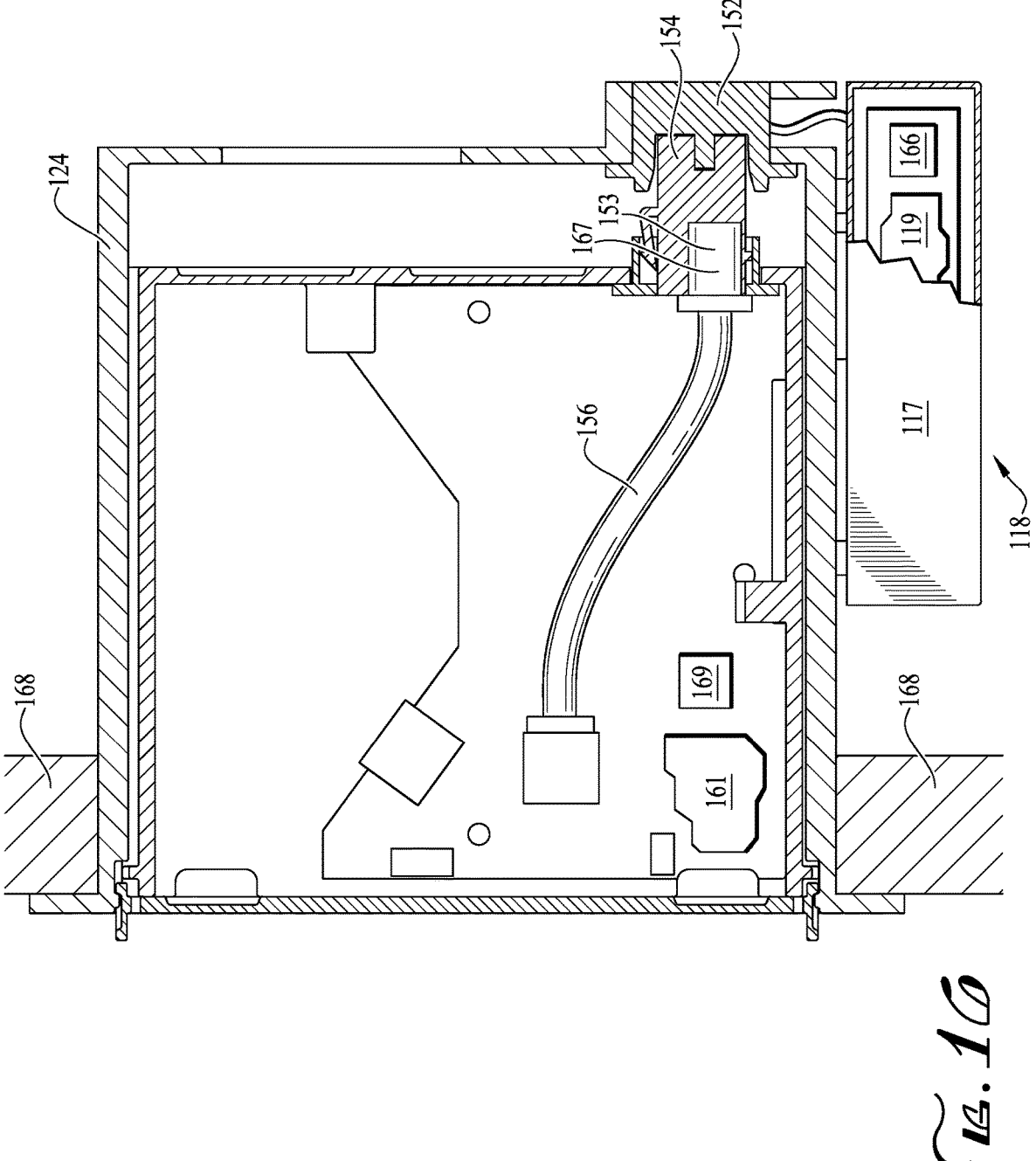
FIG. 16 is a cross-section view of one non-limiting embodiment of one module illustrating one potentially connected module; and, FIG. 17 is a perspective environmental view illustrating one non-limiting embodiment of a modular network communication system for use in the application and support of smart home features and functions.

Shown in FIGS. 6 and 13, in addition to previously indicated reference numbers, may illustrate views internal to the module bay assemblage 138 which illustrates a female data/power connection 152. The guides 110 and the guide slots 144 aid in aligning a male data/power connection 154, located to the back of the modules 104, with the female data/power connection 152, located to the back of the module bay assemblage 138, such that a connection for data and power to a modules 104 may be properly aligned and connected. FIG. 13 is useful in illustrating that a wide variety of connection wires 156 are contemplated. In some embodiments, the female data/power connection 152 and the male data/power connection 154 may be that of conventional Universal Serial Bus Type-C connectors (USB-C) but may be contemplated to function with a wide variety of other types of connectors such as USB Type-A, USB 2.0, USB 3.0, USB Mini A, USB Mini B, 4 pin Micro USB, digital optical Toslink cables, VGA cables, DVI ports, HDMI ports, data cables, Firewire connectors, eSATA cable, or other networking and/or other types of data and power cables not explicitly mentioned herein as is shown in FIG. 13. Importantly, while a female data/power connection 152 and a male data/power connection 154 may be illustrated, generally speaking, because the orientation of the male and female end is irrelevant, both may be referred to as a data connection point 153 (for example, as seen in FIG. 16). Moreover, because of the nature of modern electronics, the node power connection point 167 and the data connection point 153 may use the same terminal, thus the same component may be capable of more than one functionality.

Turning now to FIG. 7, in addition to previously indicated reference numbers, illustrates a wiring schematic for the connection wires 156. It should be understood that this is only one particular embodiment of the wiring schematic for the connection wires 156 and that other layouts are contemplated. Each bay 102 is contemplated to have its own individual female data/power connection 152 port located to the back of the module bay assemblage 138. The specific location of the female data/power connection 152 may be in any particular location; however, in preferred embodiments the female data/power connection 152 will be positioned such that the male data/power connection 154 can make easy connection 100% of the time that the modules 104 are inserted into the bays 102.

Further illustrated in FIG. 7 is controller 118 illustrated on one side of the module bay assemblage 138. It is contemplated that the controller 118 may occupy less that one full bay 102 in some embodiments. For ease of understanding the controller 118 is illustrated as occupying a full bay 102. The controller 118 is illustrated as being connected to an Ethernet port 140 and a power connection point 142, either of which may be capable of providing power and data, for example, the Ethernet port 140 may be powered by Power over Ethernet (PoE) means. However, it should be noted that the controller 118 may be powered for operation either by battery power or by hard wired power, and may further transmit data by existing Wi-Fi repeater technology, or other means previously discussed. Thus the controller 118 may not require a physical connection to an Ethernet or power cord to operate within the scope of the intended design.

Figure 8:
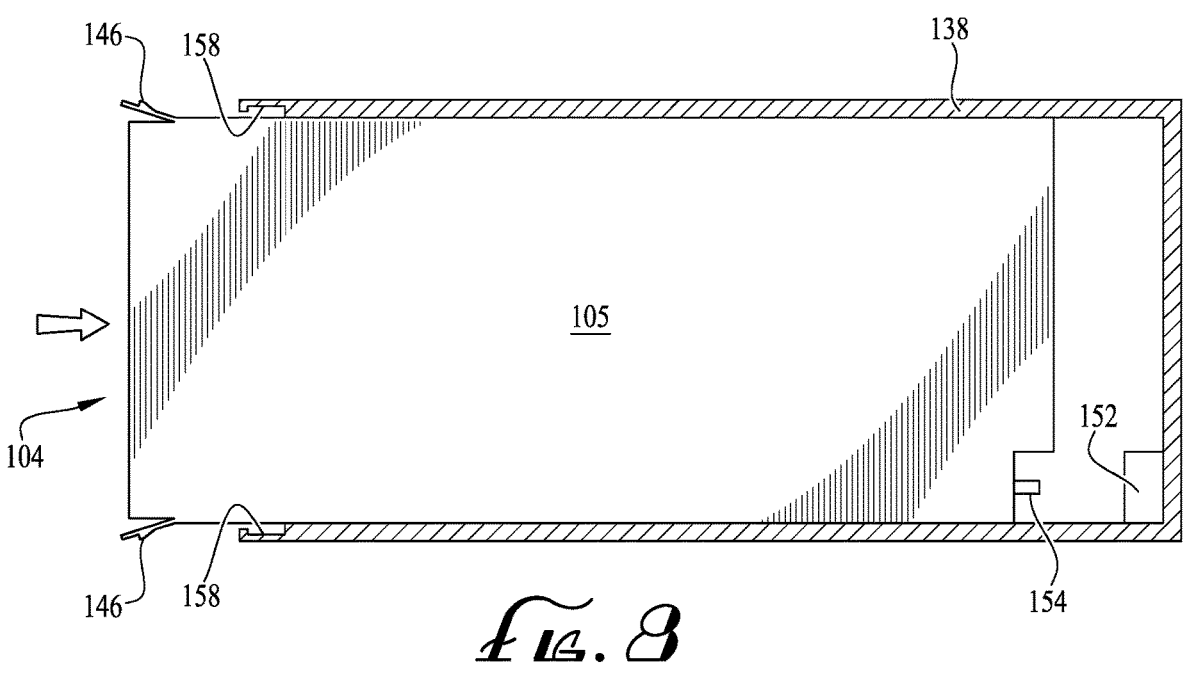
Figure 9:
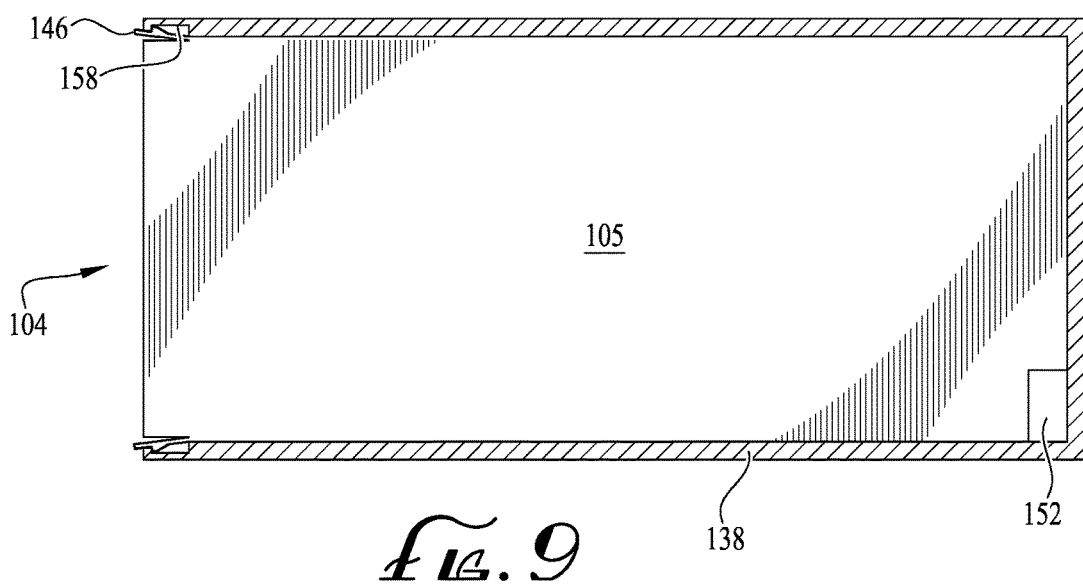
FIG. 9 is a sectional side view of one non-limiting embodiment illustrating a module inserted into a bay of a module bay insert.

FIGS. 8 and 9, in addition to previously indicated reference numbers, illustrate how the modules 104 may be inserted and locked into an operative position within the module bay assemblage 138. Shown is the retention clip 146 being guided into a retention slot 158. The retention slot 158 may retain and hold the modules 104 in place by way of biased compression forces from the retention clip 146. As is illustrated, the retention clip 146 essentially comprises one lateral flange which is outwardly biased which mates with the retention slot 158 such that the retention clip 146, and therefore the modules 104, cannot back out, fall out, or disconnect. Additionally, well-illustrated are the connection of the female data/power connection 152 and the male data/power connection 154. FIG. 8 shows the connection of the female data/power connection 152 and the male data/power connection 154 immediately prior to complete connection, which is shown in FIG. 9. Accordingly, FIG. 9 does not show the male data/power connection 154 due to it being obscured via a connection with the female data/power connection 152.

Figure 17:
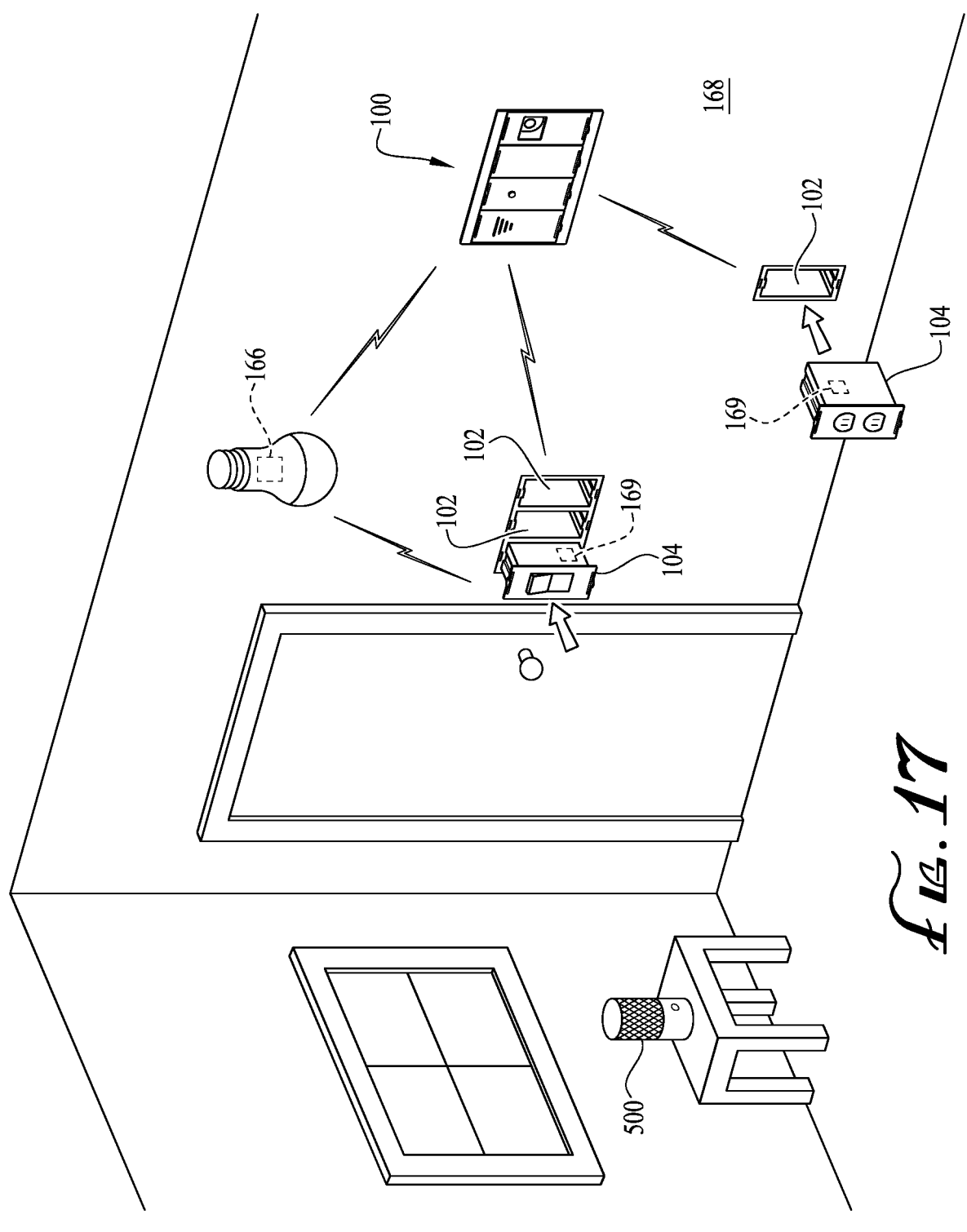

Turning now to FIGS. 10 and 11, in addition to previously indicated reference numbers, each may represent a non-limiting embodiment wherein the modular network communication system 100 is placed onto the surface of a wall and is not necessarily installed congruent with a pre-existing HVAC register. Moreover, an industry-standard register 300 is illustrated in FIG. 10; however, it may be noted that the exact location of the industry-standard register 300 is relatively inconvenient for this particular living quarter configuration. FIG. 10 therefore well illustrates the wide-ranging modularity of the modular network communication system 100 and how it may incorporate into a wide variety of existing living quarters, commercial space, and other occupiable and habitable spaces. In the case of FIG. 17, both the modular network communication system 100 is shown, also the use of a single modules 104 is shown, and the use of a modules 104 in a group is shown. As has been stated herein, the modules 104 may be used singularly or may be used in a grouping, and in either case, may operate without the use of a module bay assemblage 138 or mountable hub 124. As is seen in FIG. 17, modules 104 may function as a light switch or a power outlet. This may, therefore, be an exemplary illustration of the contemplated uses. The modules 104 may be fully capable of complete functionality without any additional hardware. Further, a single modules 104 may also be used in tandem with a single bays 102 as is seen.

Both FIGS. 10 and 17 may highlight another configuration contemplated wherein a more permanent installation is sought. The modular network communication system 100 may be installed into a wall as opposed to on the surface of a wall. Yet another configuration would be installed onto the surface of a wall which is adjacent to an industry-standard register 300. Yet another configuration would be that of installation into a wall, permanently, and adjacent to an industry-standard register 300. Additionally, each of the aforementioned configurations in which installation is adjacent to an industry-standard register 300 may be likewise achieved through the use of the kit 200 wherein the industry standard register 300 is replaced with a register 106 as illustrated in FIGS. 1 and 4. Such replacement may provide for a higher quality finish to the interior space as may be needed by an end-user.

Figure 14:
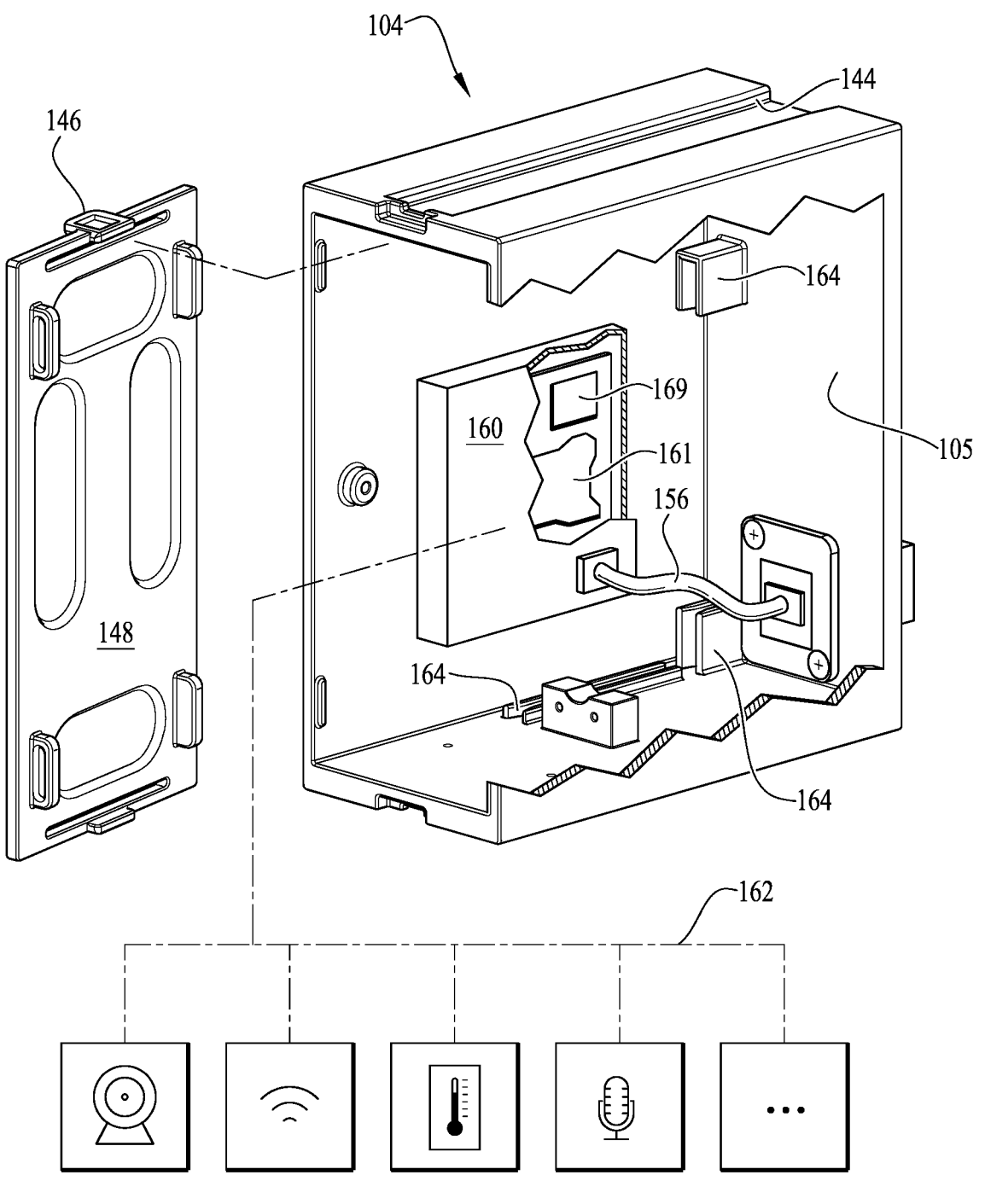
FIG. 14 is a broken view of one non-limiting embodiment of one module illustrating broad versatility of a module.

Turning now to FIG. 14, shown may be the internal components of any given modules 104 for use either alone or in conjunction with the modular network communication system 100. The modules 104 may be designed such that each modules 104 may be considered a blank template by which downstream manufacturers may then insert various hardware and software. Accordingly, the modules 104, and the modular network communication system 100, may be considered fully modifiable to fit any other application which may be deemed necessary by an end-user or a manufacturer. It is therefore one intent of this application to describe a system in which may be fully compatible with any item which may fall into the category of a network connectible device, and/or any device falling into the category of internet of things (an IoT device). In achieving this system, the modules 104 may be specifically designed for use by a wide array of supported downstream functionality 162 by way of integrated second processing circuitry 160 located under a second circuitry housing 161. The second processing circuitry 160 may be capable of handling a broad array of communication protocols 121. The use of one or more than one support brackets 164 may be employed by said supported downstream functionality 162 manufactures. The support brackets 164 may be used to hold a wide variety of potential add-ons, by way of example only, additional electronics, sensory equipment, housings, biometric sensors, heat sensors, and any other equipment deemed necessary to make the modules 104 usable by supported downstream functionality 162 manufacturers.

It should be noted and indicated that while the modular network communication system 100 may be operable as a complete multi-bay and modular unit which may house a multiplicity of modules 104, a single modules 104 may still be completely functional as a single modules 104. This may be achieved by including a wireless communication chip 166 with the modules 104. Said wireless communication chip 166 may be located at any location convenient for manufacturing but is illustrated as being located internally to the second circuitry housing 161. The wireless communication chip 166 may be compatible with any computer system. The wireless communication chip 166 may be an integrated circuit and may employ, by way of example only, radio frequency (RF), microwave, 2.4 GHz, 5 GHz, 6 GHz, 60 GHz, or any other wireless communications frequencies or data transmission applications. Additionally, the wireless communication chip 166 may be used in fixed broadband wireless access networks that use point-to-multipoint architecture. Said wireless communication chip 166 chips may be based on the IEEE 802 family protocols, which may include, for example only, any of the 802.11 type standards or amendments. The wireless communication chip 166 may further operate on either a local area network or may be connected to internet-based applications. The wireless communication chip 166 may be configured for any type of wireless communication, including but not limited to; Wi-Fi (WLAN), Bluetooth, broadcast radio, radar, satellite communications (GPS), RFID, Infrared, RF, GSM, radiofrequency, CDMA, all mobile communication systems, or any other presently unnamed mode or any unforeseen future wireless communication modes.

Figure 15:
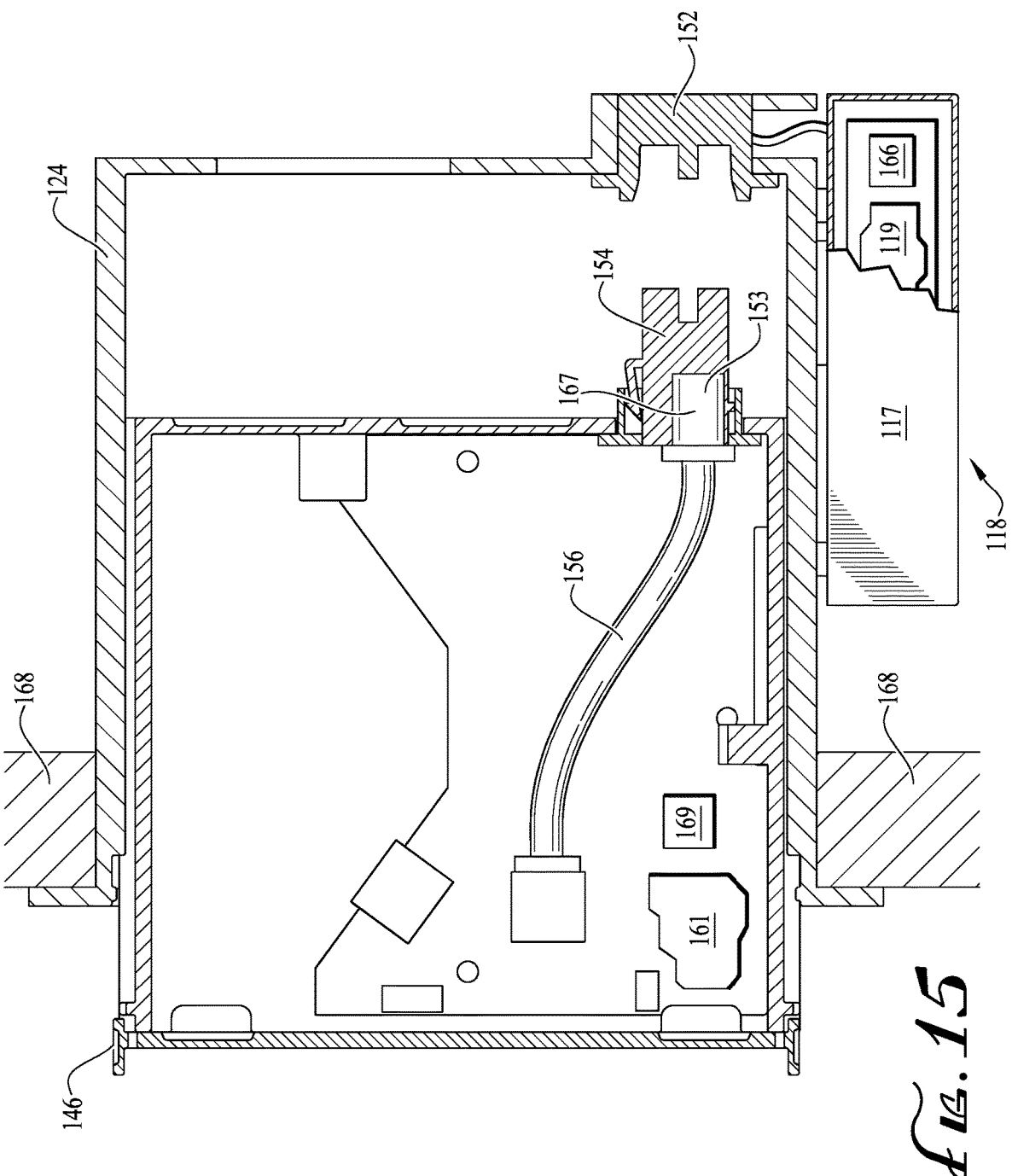
FIG. 15 is a cross-section view of one non-limiting embodiment of one module illustrating one potential connection mode.

FIGS. 15 and 16 may be illustrative of various additional embodiments for connection modes of any given modules 104 to any given mountable hub 124 or module bay assemblage 138. As illustrated, the male data/power connection 154 is associated with the modules 104, and the female data/power connection 152 is associated with the mountable hub 124; however, it should be indicated herein that this may also be in the reverse with the male data/power connection 154 being associated with the mountable hub 124 and the female data/power connection 152 associated with the modules 104.

Having disclosed the structure of the preferred embodiments, it is now possible to describe its function, operation, and use. As noted, the modular network communication system 100 may be fully integrated with multiple existing HVAC industry standard register 300 locations and may be further considered an assembly capable of retrofitting or installing in new construction. Such modular network communication system 100 may further represent a multi-function centralized data hub that may be elected to integrate with existing HVAC register locations. The modular network communication system 100 may be equipped with the ability to send, receive, aggregate, and process data; store and disseminate programs, instructions, or a series of instructions. The modular network communication system 100 may provide enhanced functionality for interconnected business, industrial, and/or home structures, or any other structures occupiable by occupants, without the negative impact of multiple independent devices.

This modular network communication system 100 may further be defined as a Multi-Function centralized data hub that may be elected to be installed adjacent to an existing industry standard register 300 or installed with a kit 200 therein replacing the industry-standard register 300. Further, the register 106 may be comprised of a common register housing modified for use in the kit 200, or a register housing that is custom produced for the end user's functional geometric requirements. Moreover, the modular network communication system 100 may be configured to both control the flow of heated or conditioned air via communication with a previously installed smart thermostat (not shown). Further, the modular network communication system 100 may incorporate additional space allocated among one or more bays 102 throughout for the addition of multi-purpose, geometrically customizable and configurable, and programmable devices further defined herein as the modules 104. Moreover, said bays 102 may be in greater or lesser number than illustrated through the various figures, and modules 104 may occupy a whole bay 102, or any fraction of a bay 102 therein. Such modules 104 may be designed to add mechanical, analog, and digital functionality, interconnected via a controller 118. The controller 118 may further be defined as a centralized digital and electrical processor providing both data and power connection to each module 104 affixed thereon. Controller 118 may be fully programmable to suit an end-users desired functionality. Controller 118 may further contain the first processing circuitry 119 and may additionally control any optional user experience or user interface for the control of the modular network communication system 100 or modules 104. Moreover, the first processing circuitry 119 may be fully capable of using a broad array of programmed communication protocol 121.

The body of the modular network communication system 100 may be designed to allow easy installation in all areas where HVAC registers are currently utilized. Moreover, the modular network communication system 100 may be configured to match the multitude of sizes currently being utilized, including but not limited to placement in both new construction as well as ease of retrofit at an existing location. It may be constructed so as to maximize the usable space for the installation of module 104, along with the ability to add, delete or change modules 104 at will, with the controller 118 providing connectivity to any module 104 that is utilized while minimizing disturbance to airflow. As there are a plurality of HVAC register styles on the market, the location each individual component may be optimized for the specific style of the HVAC register so-as to ensure the greatest functionality of each individual component, and the several embodiments overall.

The controller 118 may provide a single point of communication and power between the modules 104 of the module bay assemblage 138, and all modules 104 affixed thereto, with the ability to send, receive, aggregate, and process data, and to any location throughout a foundational structure whether industrial, governmental, commercial, residential or any other installation location, further including the ability to interconnect between controller 118 and module 104 via wired, wireless, or any other means. The controller 118 contains functionality to provide for a module 104 and/or a plurality of modules 104, to operate as-according to a program, instruction, or series of instructions without the requirement of connecting to any other device on a given network, based on a given input, program, instruction and/or series of instructions. Moreover, said foundational structure may be defined as any structure which is constructed upon a foundation and being permanently affixed therein. Said foundational structure may further be defined as any structure, mobile or permanently affixed, but which may derive power from a source which has originated from other than, or as a function of, the operation of the structure, to the exclusion of electrically powered vehicles. Such power originating sources may include, but are not limited to, any AC or DC source, solar, wind, hydroelectric, or generators. Said foundational structure may have the modular network communication system 100 and said modular network communication system may be configured to support network communications. However, the modular network communication system 100 may be additionally designed for the integration of communications with an IoT (not shown) and being configured for installation into the said foundational structure.

Certain embodiments to the present disclosure include, but are not limited to a modular network communication system 100 comprised of metallic, plastic, or other durable materials, or a combination thereof. The modules 104 may be prefabricated with housings constructed of a wide range of plastics which may be molded, a wide range of metals which may be cast, printed, or made of machine reduction technique, or made of a combination of metals and plastics. The modules 104 may be of any shape and size provided that the functional limitations required of any one module 104 are maintained. Additionally, modules 104 may be configured to take any form factor deemed necessary to achieve the necessary supported downstream functionality 162, by way of example only and not limiting, modules 104 may take the form factor of a ceiling fan, a smart window shade, smart pet doors, or any IoT device. To further the example only, a modules 104 may utilize any type of light fixture connector, whether screw base, bi-pin base, twist and lock base, pin base, or any other type of speciality base. Additionally, modules 104 may be designed to operate off of any power source, ranging from 85 volts to 480 volts, AC power, DC power, or any yet to be identified type of electrical power and may utilize power from any source, whether based on fossel fuels, hydroelectric, solar, wind, nuclear (fusion or fission), or any other source not explicitly detailed herein.

Modules 104 and the variety of disclosed embodiments of modules 104 therein may include functions directed to electrical, electronic, mechanical, optical, thermal, audio, visual, tactile, aromatic, metering, and/or data collection, transmittal, and/or reception capabilities. Such capabilities may include current technology and a wide array of pending emerging technologies. The controller 118 may offer the ability to provide power to, and to send, receive, aggregate, and process data to and from each of the modules 104, and to and from any other modules 104, including another controller 118 as related to another modular network communication system 100 in a given system. The modules 104 may communicate either via wire, wirelessly, or by any other means thereby enabling the capability of a modular network communication system 100. The controller 118 may be equipped with the ability to store and disseminate programs, instructions, or a series of instructions to each of the modules 104 with independent connectivity to any other device so likewise compatible and understood by those skilled in the art.

The modular network communication system 100 and kit 200 thereof may function by installation in a place of traditional industry-standard register 300, during new construction as a full kit 200, or in the case of installing the modular network communication system 100 only, may function in addition to traditional industry-standard register 300. Kit 200 is contemplated to function as a replacement for industry standard register 300, and portions of the kit 200 may subsequently be connected to receive power as well as the ability to transmit and receive data either via wire, wireless, or by other means, to a network which may include other controllers 118 and modules 104, and other devices which may be associated with modular network communication system 100. The modular network communication system 100 may be located at multiple points throughout a structure. These other modular network communication system 100 in turn, may have the ability to transmit power and/or transmit and/or receive data to or from any other controller 118, or other devices which may cause data aggregation for additional processing and output, and to carry out functions as may be required by a user, including but not limited to electrical or program changes to or from a module 104, or the controller 118, or another component. Power for any given module 104 may also be derived from a connection to the controller 118 of the modular network communication system 100. As the system is modular by design, a plurality of devices may be used in any configuration that the user desires, and is interchangeable to adapt to changing needs of the user or additional functionality provided by emerging device technology.

Methods of installation include configurations wherein a location is selected, the location is determined whether the permanent or temporary installation is to proceed. The following steps will apply whether installation occurs adjacent to a register or not adjacent. The substantial difference will be a lack of consideration for the removal of an industry-standard register 300 or the use of a kit 200. Where a location is selected which is not adjacent to a register, commonly used fasteners may be used to secure the mountable hub 124 to the wall initially, examples include but are not limited to sheetrock anchors. After mounting the mountable hub 124, insertion of the module bay assemblage 138 may occur then the filling of the bays 102 with modules 104 may proceed after all relevant power and or data connections are made if not powered by a battery. Alternatively, removal of a portion of the wall is contemplated for permanent installation as described below.

If temporary, it is then determined if kit 200 is to be used or if the installation is to occur adjacent to industry-standard register 300. If kit 200 is used, then industry-standard register 300 is removed and replaced with register 106. The mountable hub 124 placed to the location such that the mounting apertures 128 are aligned with register fastener aperture 134 and register fasteners 112 may thus be inserted through respective apertures for secure mounting. If no kit 200 is used, then the mountable hub 124 is brought near to align mounting apertures 128 as near as possible with industry-standard register 300 apertures, and use of self-tapping and/or self-threading screws may be utilized. It is contemplated that a mounting template made of paper or other material may or may not be used to locate mounting apertures 128 before mounting. In either case of installation, with or without a kit 200, after the mountable hub 124 is mounted, the module bay assemblage 138 is then inserted into the mountable hub 124. The bays 102 may then be filled with respective modules 104 as is so selected, the connections made to the Ethernet port 140 and/or power connection point 142 via either the first port 130 or second port 131 or connected by wireless means previously described.

If permanent installation is contemplated, then the same assessment occurs of initially determining if a kit 200 is to be employed. If kit 200 is or is not used, the permanent installation will result in the modular network communication system 100 being installed internally to the wall as opposed to on the wall. The wall section will be first removed. The mountable hub 124 will be placed into the wall void and secured into place by either securing to the internal structure of the wall or by other commonly used means. Prior to returning the register 106 or industry-standard register 300, the user may then insert the module bay assemblage 138 into the insert chamber 132 of the mountable hub 124. All cables for all connections to the Ethernet port 140 and/or power connection point 142 may be made through either the first port 130 or second port 131 with additional contemplations directed to connections made to the rear of the controller 118 or connected by wireless means previously described. The register 106 may then be placed over top, or the industry-standard register 300 may be returned. The bays 102 may then be filled with respective modules 104 as selected by an end-user.

A user of a modules 104 or of a modular network communication system 100 may contemplate installing the modular network communication system 100 or modules 104 during new construction or may retro-fit old construction to incorporate said modules 104 or modular network communication system 100. Accordingly, a user of a modules 104 or of a modular network communication system 100 may replace all wall outlets providing power with modules 104 and bays 102. Doing so may permit a user of modules 104 or of the modular network communication system 100 to swap out a light switch for a power outlet, or vice versa. Or, a user of modules 104 or modular network communication system 100 may replace the location of a power outlet with any type of modules 104, and because the modules 104 may be of any configuration desired by supported downstream functionality 162, the user may place any device desired into that position. Such modularity inherent in the design of modules 104 and modular network communication system 100 would enable a user to place a modules 104 that is configured to function as a light at one location of a structure and place a switch at an opposite side of said structure without the need to run electrical lines between the light and the switch.

Referring to FIGS. 1 to 17, herein described may be a modular network communication system 100 for a foundational structure that may comprise the foundational structure. Said structure may have the network communication system 100. The network communication system 100 may be configured to support a broad array of network-related communications of the foundational structure. The foundational structure's modular network communication system 100 may have a controller 118 unit, a power connection point 142, a communication protocol, and an optional user interface supporting a user experience, and a one or more than one network node 104. The controller 118 unit may have a first processing circuitry 119 and may be configured to utilize the communication protocol 121 for controlling the foundational structure's modular network communication system 100 and may be further configured to communicate with at least one, but also more than one network node 104 and at least one, but also more than one network-connected device 500 which may or may not be connected to the internet. The user interface supporting a user experience may be separately installed by downstream manufactures when the said manufacturers are installing the supported downstream functionality 162 or may be installed into the controller 118 first processing circuitry 119.

Still referring to FIGS. 1 to 17, the one or more than one network node 104 may be configured to communicate with the controller 118 unit and may have a second processing circuitry 160. The second processing circuitry 160 may be configured to additionally utilize the communication protocol 121 to send and receive data from the controller 118 unit and may be further configured to support the modular network communication system 100 from any a localized point of the foundational structure. The term "any localized point" may refer herein to a location, selected by an installer, of a foundational structure. Said location may be any point of the foundational structure wherein installation is feasible, by way of example, a module 104 may be installed to the exterior portion of the roofing of the structure and configured as a weather monitor, or a module 104 may be installed to the subflooring of the foundational structure and configured to detect leaks/moisture. The one or more than one network node 104 may also be further configured to communicate with the one or more than one network-connected device 500. The node 104 may further have a node housing 105 or a module housing 105. Node housing 105 and module housing 105 may be used interchangeably herein. The node housing 105 may also have a node power connection point 167 for the supply of power and a data communication connection 153 for the sending and receiving of information. The node power connection point 167 and the data connection point 153 may share the same physical architecture due to the nature of modern electronics or may share separate architecture depending on the needs of an end consumer or manufacturer. Further, the node housing 105 may be configured for installation at any localized point of the foundational structure. The controller 118 may be housed by a controller unit housing 117. The controller unit housing 117 may further have the power connection point 142 configured to connect to a power source, the data communication connection 153 for the sending and receiving of information. The controller unit housing 117 may be configured for installation at any localized point of the foundational structure.

Additionally, and still referring to FIGS. 1 to 17, herein further described may be a modular network communication system 100 which may comprise the modular network communication system 100. The modular network communication system 100 may be configured for the integration of communications with one or more than one a network-connected device 500 and may be further configured for installation into a foundational structure. The modular network communication system 100 may further have a controller unit 118, a power connection point 142, a communication protocol 121, a one or more than one network node 104, and first processing circuitry 119. The first processing circuitry 119 may be configured to utilize the communication protocol 121 for controlling the flow of information on the modular network communication system 100 and may be configured to additionally communicate with the one or more than one network node 104 and the one or more than one network-connected device 500. The one or more than one network node 104 may be configured to communicate with the controller 118 unit and may further have a second processing circuitry 161. The second processing circuitry 161 may be configured to utilize the communication protocol 121 to send and receive data from the controller 118 unit and may be further configured to support the modular network communication system 100 from any a localized point of the foundational structure.

Additionally, and still referring to FIGS. 1 to 17, the one or more than one network node 104 may be further configured to communicate with the one or more than one network-connected device 500. The nodes 104 may require a node housing 105, the node housing 105 may support a node power connection point 167 and may be configured to connect to the node power connection point 167, and a data communication point 153 for the sending and receiving of information. The node housing 105 may be configured for installation into a node bay 102, the bay 102 configured for installation at any localized point of the foundational structure. The modular network communication system 100 may further have a controller unit housing 117. The controller unit housing 117 may have the power connection point 142 and may be configured to connect to any power supply. The controller unit housing 117 may further support the data connection point 153 for the sending and receiving of information. The controller unit housing 117 may be configured for installation at any localized point of the foundational structure.

Additionally, and still referring to FIGS. 1 to 17, herein further described may be a modular network communication system 100 which may comprise a module bay assemblage 137 which may have a one or more than one module bay 102, a controller 118, a power connection point 142, and a data connection point 153. The one or more than one module bay 102 is configured to reversibly receive a module 104. The bay 102 may have guides 110 which may aid in the proper alignment of the modules 104 during removal or replacement of module 104. The controller 118 may have a first processing circuitry 119. The first processing circuitry 119 may be configured to utilize a communication protocol 121 for controlling the flow of information and further may be configured to communicate with the one or more than one module 104 and a one or more than one network-connected device 500. The module 104 may have a module power connection point 167, and second processing circuitry 160. The second processing circuitry 160 may be configured for a supported downstream functionality 162 by one or more than one manufacture. The supported downstream functionality 162 therein may define the ultimate functionality of the network module.

Additionally, and still referring to FIGS. 1 to 17, the communication protocol 121 may be further controlled, augmented, and modified by a machine-learning algorithm to enhance user enjoyment. Further, said user enjoyment may also be enhanced by the inclusion of a user experience and interface system. The user experience and interface system may allow a user to notify the modular network communication system of the specific location of the one or more than one module of the foundational structure. Said user experience and interface system may be incorporated into the first processing circuitry 119 and/or the second processing circuitry 160.

While embodiments of the disclosure have been illustrated and described, it is not intended that these embodiments illustrate and describe all possible forms of the disclosure herein. Rather, the words used in the specification are words of description rather than limitation, and it is understood that various changes may be made without departing from the spirit and scope of the several embodiments.

Accordingly, it is not intended that the disclosure be limited except by the appended claims. Insofar as the description above and the accompanying drawings disclose any additional subject matter that is not within the scope of the claims below, these several embodiments are not dedicated to the public and the right to file one or more applications to claim such additional embodiments is reserved.

What is claimed is:

1. A modular network communication system comprising; a module bay assemblage having a one or more than one module bay, a controller, a power connection point, and a connection wires;

the one or more than one module bay being configured to reversibly receive a module;

the controller having a controller housing and a first processing circuitry;

and the module having a module power connection point, a data connection point, and a second processing circuitry;

wherein the first processing circuitry is configured to utilize a communication protocol for controlling an information flow;

the first processing circuitry communicating with the module and a network connected device;

the second processing circuitry supporting down stream functionality by a manufacturer, the supported downstream manufacturer functionality therein defining an ultimate functionality of the module;

the second processing circuitry utilizing a communication protocol for controlling an information flow and communicating with the controller and the network connected device;

the first processing circuitry and the second processing circuitry utilizing a user experience and interface system, the user experience and interface system therein identifying the modular network communication system of a specific location of the module.

2. The modular network communication system of claim 1, wherein the module bay assemblage is configured for installation at any a localized point of a foundational structure.

3. The modular network communication system of claim 1, wherein the second processing circuitry is configured for a supported downstream functionality by a one or more than one manufacture, the supported downstream functionality therein defining an ultimate functionality of the module.

4. The modular network communication system of claim 1, wherein the first processing circuitry is configured to utilize a communication protocol for controlling an information flow and being further configured to communicate with the one or more than one module and a one or more than one network connected device.

5. The modular network communication system of claim 1, wherein the second processing circuitry is configured to utilize a communication protocol for controlling an information flow and being further configured to communicate with the controller and a one or more than one network connected device.

6. The modular network communication system of claim 1, wherein a node housing has a guides, said guides configured for the alignment of the data connection point of the module with the data connection point of the bay.

7. The modular network communication system of claim 1, wherein the communication protocol is further controlled and modified by a machine learning algorithm.

8. The modular network communication system of claim 1, wherein the first processing circuitry and the second processing circuitry utilize a user experience and interface system, said user experience and interface system allowing a user to notify the modular network communication system of the specific location of any one the module of the foundational structure.

9. A node for the support of a network communication system comprising: a node having a node housing and a second processing housing, a data connection point, and a node power connection point, said second processing housing having a second processing circuitry and a node wireless communication chip; the node being configured for the reversible insertion into a bay, said bay being configured for installation at any the localized point of a foundation al structure; wherein a first processing circuitry is configured to utilize a communication protocol for controlling an information flow;

the first processing circuitry communicating with the node and a network connected device;

the second processing circuitry supporting down stream functionality by a manufacturer, the supported downstream manufacturer functionality therein defining an ultimate functionality of the node;

the second processing circuitry utilizing a communication protocol for controlling an information flow and communicating with a controller and the network connected device;

the first processing circuitry and the second processing circuitry utilizing a user experience and interface system, the user experience and interface system therein identifying the network communication system of a specific location of the node.

10. The node for the support of a network communication system of claim 9, wherein second processing circuitry is configured for a supported downstream functionality by a one or more than one manufacture, a supported downstream functionality therein defining an ultimate functionality of the network module.

11. The node for the support of a network communication system of claim 9, wherein the second processing circuitry utilizes a user experience and interface system, said user experience and interface system allowing a user to electronically interface with the node and instruct the node about the support downstream functionality and the specific location of the node in a foundational structure.

12. The node for the support of a network communication system of claim 9, wherein the communication protocol is further controlled and modified by a machine learning algorithm.

13. The node for the support of a network communication system of claim 9, wherein node housing has a guides, said guides configured for a alignment of the data connection point of the node housing with the data connection point of the bay.

14. A communication system comprising; a module bay assemblage having a module bay, a controller, a power connection point, and a connection wires; the module bay configured to reversibly receive a module; the controller having a controller housing and a first processing circuitry; and the module having a module power connection point, a data connection point, and a second processing circuitry;

wherein the first processing circuitry is configured to utilize a communication protocol for controlling an information flow;

the first processing circuitry communicating with the module and a network connected device;

the second processing circuitry supporting down stream functionality by a manufacturer, the supported downstream manufacturer functionality therein defining an ultimate functionality of the module;

the second processing circuitry utilizing a communication protocol for controlling an information flow and communicating with the controller and the network connected device;

the first processing circuitry and the second processing circuitry utilizing a user experience and interface system, the user experience and interface system therein identifying the modular network communication system of a specific location of the module.

15. The modular network communication system of claim 14, wherein the module bay assemblage is configured for installation to a building which is permanently attached to a foundation.

16. The modular network communication system of claim 14, wherein the module bay assemblage is configured for installation to a building which lacks a foundation.

17. The modular network communication system of claim 14, wherein a node housing has a guides, said guides configured for an alignment of the data connection point of the module with the data connection point of the bay.

18. The modular network communication system of claim 14, wherein the communication protocol is further controlled and modified by a machine learning algorithm.

* * * * *